US008177620B2

(12) United States Patent
Miles et al.

(10) Patent No.: US 8,177,620 B2
(45) Date of Patent: May 15, 2012

(54) GAMING DEVICE HAVING A MODIFIER ACTIVATOR

(75) Inventors: Michael J. Miles, Brickhouse Farm (GB); Dov L. Randall, Las Vegas, NV (US); Peter Gerrard, Prestwich (GB)

(73) Assignee: IGT, Reno, NV (US)

( * ) Notice: Subject to any disclaimer, the term of this patent is extended or adjusted under 35 U.S.C. 154(b) by 612 days.

(21) Appl. No.: 10/539,848

(22) PCT Filed: Dec. 19, 2003

(86) PCT No.: PCT/GB03/05587

§ 371 (c)(1), (2), (4) Date: Jan. 11, 2006

(87) PCT Pub. No.: WO2004/057499

PCT Pub. Date: Jul. 8, 2004

(65) Prior Publication Data

US 2006/0142077 A1 Jun. 29, 2006

Related U.S. Application Data

(60) Provisional application No. 60/501,165, filed on Sep. 8, 2003.

(30) Foreign Application Priority Data

Dec. 20, 2002 (GB) .................................. 0229635.8
Dec. 21, 2002 (GB) .................................. 0229968.3
Jul. 15, 2003 (GB) .................................. 0316463.9

(51) Int. Cl.
*A63F 9/24* (2006.01)
*A63F 13/00* (2006.01)
*G06F 17/00* (2006.01)
*G06F 19/00* (2011.01)

(52) U.S. Cl. ........................................................ 463/16

(58) Field of Classification Search .................... 463/19, 463/20, 21, 22
See application file for complete search history.

(56) References Cited

U.S. PATENT DOCUMENTS 2,135,182 A 7/1935 Joze
(Continued)

FOREIGN PATENT DOCUMENTS

AU 199716432 B2 9/1997
(Continued)

OTHER PUBLICATIONS

3-Way Action Poker Brochure and Article written by written by IGT, published in 2002.

(Continued)

*Primary Examiner* — David L Lewis
*Assistant Examiner* — Reginald Renwick
(74) *Attorney, Agent, or Firm* — K&L Gates LLP

(57) ABSTRACT

A gaming machine symbol-bearing reels which are used to play a main game involving, the selection and display of a symbol combination. Bonus events or modifiers are also selected and displayed. This may be an automatic machine function, or the player may have the opportunity to operate a further selection reel, or control buttons. The selected bonus event or modifier may be applied to features associated with or separate from the main game, such as a feature game display to which play can transfer from the main game, or may be applied to subsequent main games which may consist of free spins of the reels, or may be paid for by the player.

57 Claims, 15 Drawing Sheets

U.S. PATENT DOCUMENTS 2,545,644 A 3/1951 Benton et al.
3,463,906 A 8/1969 Chiang
4,410,178 A 10/1983 Partridge
4,492,379 A 1/1985 Okada
4,582,324 A 4/1986 Koza et al.
4,624,459 A 11/1986 Kaufman
4,695,053 A 9/1987 Vazquez, Jr. et al.
4,991,848 A 2/1991 Greenwood et al.
5,042,809 A 8/1991 Richardson
5,342,047 A 8/1994 Heidel et al.
5,344,144 A 9/1994 Canon
5,344,145 A 9/1994 Chadwick et al.
5,344,154 A 9/1994 Langstroth
5,362,052 A 11/1994 Kubatsch
5,393,057 A 2/1995 Marnell, II
5,407,200 A 4/1995 Zalabak
5,423,539 A 6/1995 Nagao
5,449,173 A 9/1995 Thomas et al.
5,456,465 A 10/1995 Durham
5,490,670 A 2/1996 Hobert
5,511,781 A 4/1996 Wood et al.
5,560,603 A 10/1996 Seelig et al.
5,580,053 A * 12/1996 Crouch .......................... 463/20
5,647,798 A 7/1997 Falciglia
5,722,891 A 3/1998 Inoue
5,732,948 A 3/1998 Yoseloff
5,772,506 A 6/1998 Marks et al.
5,775,692 A 7/1998 Watts et al.
5,788,573 A 8/1998 Baerlocher et al.
5,823,874 A 10/1998 Adams
5,833,537 A * 11/1998 Barrie ............................ 463/21
5,848,932 A 12/1998 Adams
5,855,514 A 1/1999 Kamille
5,882,261 A 3/1999 Adams
5,885,157 A 3/1999 Harada et al.
5,918,880 A 7/1999 Voigt, IV et al.
5,919,088 A 7/1999 Weiss
5,931,467 A 8/1999 Kamille
5,935,002 A 8/1999 Falciglia
5,938,196 A 8/1999 Antoja
5,947,820 A 9/1999 Morro et al.
5,964,463 A 10/1999 Moore, Jr.
5,971,849 A 10/1999 Falciglia
5,980,384 A 11/1999 Barrie
5,988,638 A 11/1999 Rodesch et al.
6,003,867 A 12/1999 Rodesch et al.
6,004,207 A 12/1999 Wilson, Jr. et al.
6,012,982 A 1/2000 Piechowiak et al.
6,015,346 A 1/2000 Bennett
6,033,307 A 3/2000 Vancura
6,059,289 A 5/2000 Vancura
6,068,552 A 5/2000 Walker et al.
6,089,978 A 7/2000 Adams
6,102,400 A 8/2000 Scott et al.
6,102,798 A 8/2000 Bennett
6,117,009 A 9/2000 Yoseloff
6,120,377 A 9/2000 McGinnis, Sr. et al.
6,142,873 A 11/2000 Weiss et al.
6,149,156 A 11/2000 Feola
6,149,521 A 11/2000 Sanduski
6,159,097 A 12/2000 Gura
6,159,098 A 12/2000 Slomiany et al.
6,162,121 A 12/2000 Morro et al.
6,165,070 A 12/2000 Nolte et al.
6,168,520 B1 1/2001 Baerlocher et al.
6,173,955 B1 1/2001 Perrie et al.
6,174,233 B1 1/2001 Sunaga et al.
6,174,235 B1 1/2001 Walker et al.
6,190,254 B1 2/2001 Bennett
6,190,255 B1 2/2001 Thomas et al.
6,203,429 B1 3/2001 Demar et al.
6,213,876 B1 4/2001 Moore, Jr.
6,220,959 B1 4/2001 Holmes, Jr. et al.
6,224,483 B1 5/2001 Mayeroff
6,231,442 B1 5/2001 Mayeroff
6,234,897 B1 5/2001 Frohm et al.
6,238,288 B1 5/2001 Walker et al.
6,261,177 B1 7/2001 Bennett
6,270,409 B1 8/2001 Shuster
6,270,410 B1 8/2001 DeMar et al.
6,270,411 B1 8/2001 Gura et al.
6,270,412 B1 8/2001 Crawford et al.
6,305,686 B1 10/2001 Perrie et al.
6,309,300 B1 10/2001 Glavich
6,311,976 B1 11/2001 Yoseloff et al.
6,312,334 B1 11/2001 Yoseloff
6,315,660 B1 11/2001 DeMar et al.
6,315,663 B1 11/2001 Sakamoto
6,319,124 B1 11/2001 Baerlocher et al.
6,328,649 B1 12/2001 Randall et al.
6,334,814 B1 1/2002 Adams
6,336,860 B1 1/2002 Webb
6,340,158 B2 1/2002 Pierce et al.
6,347,996 B1 2/2002 Gilmore et al.
6,364,768 B1 4/2002 Acres et al.
6,375,187 B1 4/2002 Baerlocher
6,394,900 B1 5/2002 McGlone et al.
6,394,902 B1 5/2002 Glavich et al.
6,398,218 B1 6/2002 Vancura
6,398,644 B1 6/2002 Perrie et al.
6,406,369 B1 6/2002 Baerlocher et al.
6,413,160 B1 7/2002 Vancura
6,416,408 B2 7/2002 Tracy et al.
6,419,579 B1 7/2002 Bennett
6,435,511 B1 8/2002 Vancura et al.
6,439,995 B1 8/2002 Hughs-Baird et al.
6,443,452 B1 9/2002 Brune
6,454,651 B1 9/2002 Yoseloff
6,461,241 B1 10/2002 Webb et al.
6,471,208 B2 10/2002 Yoseloff et al.
6,481,713 B2 11/2002 Perrie et al.
6,491,584 B2 12/2002 Graham et al.
6,494,454 B2 * 12/2002 Adams .......................... 273/292
6,506,118 B1 1/2003 Baerlocher et al.
6,514,141 B1 2/2003 Kaminkow et al.
6,537,150 B1 3/2003 Luciano et al.
6,537,152 B2 3/2003 Seelig et al.
6,558,253 B1 * 5/2003 DeSimone et al. ............. 463/20
6,558,254 B2 5/2003 Baelocher et al.
6,565,436 B1 5/2003 Baerlocher
6,582,307 B2 6/2003 Webb
6,602,137 B2 8/2003 Kaminkow et al.
6,604,740 B1 8/2003 Singer et al.
6,607,438 B2 8/2003 Baerlocher et al.
6,612,575 B1 * 9/2003 Cole et al. .................. 273/138.1
6,632,141 B2 * 10/2003 Webb et al. ..................... 463/25
6,634,945 B2 * 10/2003 Glavich et al. .................. 463/25
6,644,664 B2 11/2003 Mur et al.
6,648,754 B2 11/2003 Baerlocher et al.
6,692,355 B2 * 2/2004 Baerlocher et al. ............. 463/16
6,692,356 B2 2/2004 Baerlocher et al.
6,712,693 B1 3/2004 Hettinger
6,719,630 B1 4/2004 Seelig et al.
6,733,386 B2 5/2004 Cuddy et al.
6,733,389 B2 5/2004 Webb et al.
6,769,986 B2 8/2004 Vancura
6,805,349 B2 10/2004 Baerlocher et al.
6,855,054 B2 * 2/2005 White et al. .................... 463/21
6,869,360 B2 3/2005 Marks et al.
6,905,406 B2 6/2005 Kaminkow et al.
6,913,532 B2 7/2005 Baerlocher et al.
6,921,335 B2 7/2005 Rodgers et al.
6,955,600 B2 10/2005 Glavich et al.
7,056,213 B2 6/2006 Ching et al.
7,066,814 B2 6/2006 Glavich et al.
7,090,580 B2 8/2006 Rodgers et al.
7,210,997 B2 * 5/2007 Hughs-Baird et al. .......... 463/20
7,235,011 B2 * 6/2007 Randall et al. .................. 463/25
2001/0009865 A1 7/2001 Demar et al.
2001/0054794 A1 * 12/2001 Cole et al. .................. 273/138.1
2002/0010017 A1 1/2002 Bennett
2002/0019255 A1 2/2002 Randall et al.
2002/0022514 A1 2/2002 Randall et al.
2003/0045348 A1 3/2003 Palmer et al.
2003/0045350 A1 3/2003 Baerlocher et al.
2003/0060265 A1 * 3/2003 Webb .............................. 463/20
2003/0060272 A1 3/2003 Glavich et al.

| | | | | |
|---|---|---|---|---|
| 2003/0064777 | A1 | 4/2003 | Baerlocher et al. | |
| 2003/0073482 | A1 | 4/2003 | Baerlocher et al. | |
| 2003/0073483 | A1 | 4/2003 | Glavich et al. | |
| 2003/0087693 | A1 | 5/2003 | Baerlocher et al. | |
| 2004/0053672 | A1* | 3/2004 | Baerlocher | 463/20 |
| 2004/0067791 | A1 | 4/2004 | Glavich et al. | |
| 2005/0049035 | A1 | 3/2005 | Baerlocher et al. | |

FOREIGN PATENT DOCUMENTS

| | | | |
|---|---|---|---|
| AU | A-50327/96 | | 10/1997 |
| AU | A-63553/98 | | 10/1998 |
| AU | 778685 | | 4/2005 |
| EP | 0688002 | A1 | 12/1995 |
| EP | 0 798 676 | A1 | 10/1997 |
| EP | 0874337 | A1 | 10/1998 |
| EP | 0926645 | A2 | 6/1999 |
| EP | 0 945 837 | A2 | 9/1999 |
| EP | 0944030 | A2 | 9/1999 |
| EP | 0 981 119 | A2 | 2/2000 |
| EP | 0984409 | A2 | 8/2000 |
| GB | 2 322 217 | A | 8/1998 |
| GB | 2 328 311 | A | 2/1999 |
| WO | WO 0012186 | | 3/2000 |
| WO | WO 00/32286 | | 6/2000 |
| WO | WO 01/26019 | A1 | 4/2001 |
| WO | 03027797 | | 4/2003 |

OTHER PUBLICATIONS

Addams Family Advertisement and Article written by IGT, Strictly Slots, published in 2000.
American Thunder Screen Shots written by IGT, published in 1998.
Bally Slot Machines Electro-Mechanicals 1964-1980 Book, Revised 3rd Edition [In Part] written by Marshall Fey.
Bonus Times written by Bally Gaming, published in 2000.
Cash Crop Brochure written by Arist O Crat Leisure Industries, published in 1997.
Catch a Wave Advertisement written by IGT, published in Dec. 2000.
Cuckoo Aristocrat Brochure written by Aristocrat, published in Feb. 1998.
DoubleBucks Brochure written by IGT, prior to Dec. 2002.
Field Testing New Slots Article, written by Strictly Slots, published in Jul. 2000.
Leopard Spots™ (website) written by www.igt.com, printed Mar. 21, 2001.
Mega Multiplier® (website) written by www.wmsgaming.com, printed May 22, 2001.
Money Grab (website) written by www.wmsgaming.com, printed May 22, 2001.
Money Mouse Brochure written by Arist O Crat Leisure Industries, published in 1997.
Polly & Roger Brochure written by VLC, Inc, published in 2000.
Take Your Pick Article written by Strictly Slots, published in Mar. 2001.
Top Cat Brochure written by WMS Gaming, Inc., published prior to 2001.
Treasure Tunnel, Treasure Wheel Brochure written by Sigma Game, Inc., published prior to 2001.
Vision Series™/Good Times™ written by IGT, published in 1999.
X Factor Brochure and Website Page written by WMS Gaming, Inc., published in 1998.
Lemons, Cherries and Bell-Fruit-Gum by Richard M. Bueschel, pp. 245-246, 1995 on or before December thereof.
Addams Family—Cousin It's Good Hair Day Advertisement written by IGT published prior to 2002.
1DU Dice Mechanism written by Starpoint Electrics Ltd., published in Jul. 2000.
1DU Dice Unit Advertisement written by starpoint.uk.com, printed on May 14, 2001.
4DU Dice Unit Advertisement written by starpoint.uk.com, printed on Sep. 3, 2002.
Dice Games article describing Poker Dice, published prior to 2001.
Double Dice Advertisement written by JHV Gaming Products, undated and English explanation from errel.com, printed on Jan. 24, 2003.
Free! 7-Day Trial on Daval's Reel Dice Advertisement written by Gerber & Glass, published in 1936.
Game Devices Advertisement written by starpoint.uk.com, printed on Sep. 3, 2002.
How to Play—Roll & Win Instructions written by WMS Gaming, wmsgaming.com, printed on Aug. 29, 2001.
I Love Lucy Advertisement written by IGT, published in 2002, on or before December thereof.
I Love Lucy Excerpt in Slots 2003, part one, written by Melissa Raimondi, published Jan. 2003.
I Love Lucy Video Slots Advertisement in The IGT Experience Slot Line Special Show Edition 2002/2003, written by IGT, published in 2002.
I Love Lucy, Chocolate Factory, IGT, published May 2003.
I Love Lucy, Vitameatavegamin, IGT, published Jan. 2003.
Levy Patent Abstract written by Derwent Publications Ltd., published in 1991.
Mikohn Solutions, World Gaming Congress 2000 Edition.
Money Grab Advertisement written by WMS Gaming, Inc., wmsgaming.com, printed on Jan. 30, 2003.
Money Grab Article written by Strictly Slots, published in Apr. 2001.
Monopoly Brochures and Articles, written by WMS Gaming, Inc., published 1998.
Monopoly Movers & Shakers article written by Strictly Slots, published Jul. 2000.
Monopoly Party Train Article written by Strictly Slots, published Feb. 2002.
New Kids Article written by Strictly Slots, published in Dec. 2000.
Roll & Win Advertisement written by WMS Gaming, wmsgaming.com, printed Jun. 8, 2001.
Slot Machine Buyer's Handbook A Consumer's Guide to Slot Machines written by David L. Saul and Daniel R. Mead, published 1998.
Slot Machines A Pictorial History of the First 100 Years, 5th edition [In Part], written by Marshall Fey, published 1983 to 1997, on or before December thereof.
Slot Machines on Parade written by Robert N. Geddes and illustrated by Daniel R. Mead, published 1980.
Starpoint 1DU Dice Unit Product Summary written by Starpoint Electrics Ltd., published in Dec. 1999.
Starpoint 4DU Game Device Product Summary written by Starpoint Electrics Ltd, available on or before Feb. 2003.
Stars, Bars and Bones Game, P&M Coinc, Inc. available 1997.
Totem Pole Advertisement written by IGT, published in 1997.
Yahtzee Video Game Advertisement, written by Mikohn Winning Solutions Worldwide, published 1999.
Slingo, Video Slots Article written by Strictly Slots published Aug. 2002.
Slingo Slots Brochure written by IGT published in 2001.

* cited by examiner

GAMING DEVICE HAVING A MODIFIER ACTIVATOR

PRIORITY CLAIM

This application is a national stage application of International Application No. PCT/GB2003/005587, filed on Dec. 19, 2003 which claims priority to, and the benefit of, the following applications: United Kingdom Patent Application Serial No. 0229635.8, filed Dec. 20, 2002; United Kingdom Patent Application Serial No. 0229968.3 filed Dec. 21, 2002; United Kingdom Patent Application Serial No. 0316463.9, filed Jul. 15, 2003; and U.S. Patent Application Ser. No. 60/501,165, filed Sep. 8, 2003.

CROSS REFERENCE TO RELATED APPLICATIONS

This application relates to the following co-pending commonly owned patent application: "GAMING DEVICE HAVING REGENERATING MULTIPLE AWARD OPPORTUNITIES", U.S. patent application Ser. No. 11/426,234 filed on Jun. 23, 2006.

TECHNICAL FIELD

This invention relates to player-operable entertainment machines, particularly coin-operated entertainment machines, which may be amusement or gaming machines, such as "fruit" or "poker" or "slot" machines, of the kind having a main display device operable in play of a main or primary game for displaying a selected combination of symbols at a win zone. As used herein the term coin is intended also to cover notes, tokens, charge or credit cards or any other means of supplying credit or monetary value.

BACKGROUND ART

The main display device of a "fruit" machine may comprise multiple side-by-side actual or video-simulated reels, say three or four reels, which in play of a main or primary game after wagering a required minimum stake value, are rotatable about a common horizontal axis within a housing behind a window at the win zone. Each reel has a respective sequence of symbols at equally spaced positions around its periphery which index through the win zone to provide a moving symbol display, and the reels are then brought to rest with one symbol on each reel displayed through the window on one or more win lines.

If the displayed combination of symbols constitutes a predetermined winning combination an award, such a cash payment to other prize, may be made available to the player.

Usually, there is the possibility, on occasions, to hold one or more reels against rotation, or to nudge one or more reels after rotation through one or more steps, whereby a player can seek to influence selection of the symbols displayed on the win line or lines.

It is also well known to provide a supplementary display or 'feature game' which can be used to enhance the entertainment value of the machine and provide additional or alternative opportunities for winning.

In particular, it is known to provide a panel having sections which can be selectively illuminated to represent movement from location to location along a trail, particularly along a wraparound trail, which may simulate the playing of a board game.

Play is transferred from the main reels to the trail of the feature game on a random or predetermined basis and illumination of the panel sections may then be effected by, or in correspondence with, a rotatable subsidiary feature reel, or otherwise, representing the spin of a reel or roll of a dice or other selection.

Awards or award possibilities may be made available to the player in dependence on the location on the trail to which play has progressed.

These awards may take the form of play features or bonuses or play modifiers which can be used by the player, such as holds or nudges. However, in order to attain these awards play must first transfer to the feature game which typically happens in only a small number of main games whereby entertainment value to the player may be limited.

It is also known to make play feature or bonus or modifier awards available during play of a main game on an occasional, unpredictable basis i.e. not related to any event apparent to the player. These may take the form of bonus games which are relatively simple and offer little player interaction. Typically the player is given the opportunity to choose one of a number of hidden prizes. Once a selection has been made all the prize values are revealed to the player. This provides only passing amusement and involves no exercise of skill or strategy. In particular, there may be little or no player anticipation whereby entertainment value to the player may be limited with this feature also.

DISCLOSURE OF INVENTION

According to one aspect of the invention therefore there is provided a player-operable coin operated gaming machine of the kind having a main display device operable in play of a main game for displaying a selected combination of symbols at a win zone, and wherein bonus events are made available on at least some occasions in relation to said main games, characterised in that said bonus events influence determination of said predetermined winning combinations, and when made available at least one of said bonus events is player-selectable from a range of such events to be effective for a plurality of games.

With this arrangement, the player can derive much entertainment value in so far as he is able to interact with win determination and can plan a strategy effective over a number of games.

Most preferably, the main display device has a plurality of symbol sequences which index through the win zone to provide a moving symbol display and then come to rest to cause the selected combination of symbols to be displayed.

The bonus events may be made available on any suitable predetermined, random or pseudo random basis in correspondence with or independent of any other appropriate event. In one embodiment the bonus events may be made available after a symbol combination of a predetermined nature has been selected and displayed at the win zone, e.g. when the combination includes one or more special symbols, particularly when a special symbol is displayed for each symbol sequence.

When available, the player may be able to select one or more bonus events, preferably one, and this may be achieved by operating a press button or touch screen or other control in relation to a displayed list of available bonus events.

The number of games for which the (or each) selected bonus event is effective may be predetermined, or may be determined automatically by the machine on any predetermined random or pseudo random basis, or may be selectable by the player using a suitable control preferably within a predetermined range. By way of example, the selected bonus event may be effective for 10 games.

A count down display or other indication may be provided to indicate to the player the current number of remaining bonus event games.

A limitation may be imposed on the selected number of bonus event games whereby only games for which pre-existing game-playing credit can be included. Alternatively the number of bonus-event games may be greater than the number for which game-playing credit is already available. Alternatively, the games may be free and played at no additional cost to the player.

With regard to the bonus events, by way of example these may comprise or include any one of more of the following:

1. All wins doubled;
2. Any win with a specified symbol in the combination (e.g. a 'bar' symbol) awards a minimum prize value (e.g. 50 credits)
3. A 'wild' symbol in the selected symbol combination increases the normal award value (e.g. multiplies by 7).
4. A symbol combination which is not normally a winning combination (e.g. all symbols are 'blanks') gives an award, particularly a predetermined award (e.g. 20 credits).
5. A single predetermined symbol in the selected symbol combination (e.g. a 'cherry' symbol) gives an award, particularly a predetermined award (e.g. 60 credits).

The symbols of the sequences may be of any suitable kind. In particularly preferred embodiment the machine is a casino 'slot' or 'fruit' machine and the symbols include bars, blanks and cherries, and the bars may be 3 bar, 2 bar and 1 bar sets.

Thus, in one example, a mixed combination of bars (e.g. 2 Bar, 2 Bar, 1 Bar) may usually pay a small award, say 5 credits. With selection of the above bonus event No. 2, the player could be assured that the mixed bar combination would give a minimum award value over the remaining bonus event games, say 50 credits.

In another example, using a typical casino machine with blanks between other symbols (e.g. Red 7—blank—3 Bar—blank—2 Bar—blank and so on) a combination of all blanks would not usually give any award, but selection of the above bonus event No. 4 could give an award of say 20 credits.

The arrangement may be such that the player can select only one bonus event which is then maintained effective as the only bonus event for all of the relevant games whereby no further option to select bonus events arises until after all of the relevant games have been played. Other arrangements are however also possible. The player may have the option of selecting more than one bonus event on one occasion and these may be effective for the same or different number of games. Alternatively or additionally the player may have the opportunity of selecting one (or possibly more) bonus events on one occasion, and may have a further opportunity in a subsequent game whilst the first-selected bonus event (or events) is still effective. In this latter case the result may be that the two (or more) selections run simultaneously or the second selection may arise after the first selection has ceased to be effective. There may even be the possibility for the player to make the same selection a second time whilst the first selection is still effective whereby this may prolong the number of games over which the selection is effective or otherwise enhance or modify the first selection.

Where two or more bonus events are effective simultaneously resulting awards may be cumulative or otherwise interact with each other. Thus, for example, where above bonus events No. 1 and No. 5 are both effective and both result in awards, the single symbol win would be double the special predetermined award e.g. 120 credits could results.

Especially where different bonus events can be effective simultaneously, individual display devices, such as alphanumeric display devices may be provided to indicate the availability of the events.

The symbol sequences may be provided on mechanical reels or video simulations thereof and there may be three side-by-side sequences e.g. provided by three reels rotatable on a common horizontal axis. Other devices and configurations are also possible.

With the arrangement of the invention the player can derive much entertainment from the ability to select bonus events and thereby plan a strategy effective over a number of games. However, much entertainment is also derived from the change in bonus events effective over multiple games.

According to a second aspect of the present invention therefore there is provided a player-operable coin operated gaming machine of the kind having a main display device operable in play of a main game for displaying a selected combination of symbols at a win zone, and wherein bonus events are made available on at least some occasions in relation to said main games, characterised in that said bonus events influence determination of said predetermined winning combinations, and when made available at least one of said bonus events is machine-selectable from a range of such events to be effective for a plurality of games.

With this arrangement, when the bonus events are made available the machine operates automatically to select at least one bonus event. This gives rise to changes in bonus events and consequent enhanced entertainment to the player even though the selection is made by the machine and not the player.

Most preferably, the main display device has a plurality of symbol sequences which index through the win zone to provide a moving symbol display and then come to rest to cause the selected combination of symbols to be displayed.

Selection of at least one bonus event from the range of such 20 events most preferably occurs in correspondence with operation of a display device which provides a moving display which comes to rest to indicate the selected bonus event. In particular the display device may comprise a real or video-simulated rotatable reel having the bonus events around its periphery. Alternatively, the selection made may be displayed on one or more from a collection of illuminable panels on any suitable display device.

The nature of the bonus events, the number of games for which the selected bonus event is maintained, and the main display device may be as described in the above first aspect of the invention.

The first and second aspects of the present invention may relate to a gaming device, and more particularly to a gaming device having multiple different functions associated with a determined number of plays of a primary game, whereby the bonus awards or events of such aspects may comprise, one of a plurality of different modifiers associated with the play of the primary game, and an obtained modifier will alter or change at least one game function, outcome or parameter of the primary game for each of a plurality of subsequent plays of the primary game. In other words, an outcome obtained in one primary game sequence may influence an outcome obtained in at least one and preferably a plurality of subsequent primary game sequences.

Thus, and in accordance with a further aspect of the present invention there is provided a gaming device comprising:

a primary game including a plurality of reels and a plurality of symbols on the reels, and each of said reels including a plurality of said symbols wherein at least one of said symbols is a modifier activator symbol;

a plurality of different modifiers, wherein each modifier is adapted to be associated with a plurality of activations of the reels; and a processor operable to cause the reels to activate and display at least one of said symbols, to provide a player any award based on the displayed symbols, select one of the plurality of modifiers if said modifier activator symbol is displayed, activate the selected modifier for each of a plurality of subsequent activations of the reels that are associated with the selected modifier, and apply the activated modifier to modify at least one function of the primary game for each of the subsequent activations of the reels that are associated with the activated modifier, wherein the modified function of the primary game is based on the activated modifier.

In one embodiment, the primary game is a slot or reel game. In this embodiment, the gaming device includes a plurality of reels. Each reel includes a plurality of symbols wherein at least one of the symbols on at least one of the reels is a modifier activator symbol. The gaming device also includes a plurality of different modifiers. Each modifier alters or changes at least one parameter, game function or game outcome associated with the slot or reel game for a number or plurality of subsequent slot or reel games (i.e., reel spins). That is, a modifier activated in one reel spin may influence the play of a plurality of subsequent reel spins. For example, one modifier may alter the prize or amount associated with one or more symbols or combinations of the symbols on the reels. Another modifier may provide a prize or amount each time the reels spin, while another modifier may alter the number of paylines activated per wager. The gaming device also includes a counter that displays or indicates the number of subsequent reel spins or primary games that each activated modifier will remain activated for or will apply to.

In one embodiment, upon the initiation of the reel or slot game of the present invention, the gaming device enables the player to cause the reels to spin. The player is provided any award or prize based on the symbols or combination of symbols displayed on the reels after they stop. Moreover, if at least one modifier activator symbol is displayed on an active payline on at least one of the stopped reels, then at least one of said plurality of modifiers is selected. In another embodiment, a plurality of modifier activator symbols must be displayed on a plurality of the stopped reels, for at least one of said plurality of modifiers to be selected.

The gaming device activates the selected modifier for a plurality of subsequent reel spins. That is, for the plurality or number of subsequent spins that the selected modifier is activated for, the activated modifier will alter or modify at least one function, parameter or outcome of the reel game. For example, if an "ALL WINS PAYS 2×" modifier is activated for ten subsequent reel spins, then for each of the next ten reel spins, any prize associated with a winning symbol or combination of symbols on the stopped reels will be doubled.

Each modifier is associated with at least one and preferably a plurality of subsequent reel spins that the modifier will be active for. In one embodiment, each modifier is associated with the same number of subsequent reel spins. In another embodiment, a plurality of the modifiers are associated with different numbers of subsequent reel spins. In another embodiment, the number of subsequent reel spins that the selected modifier will be active for is predetermined or randomly determined by the gaming device. In another embodiment, the number of subsequent reel spins that the selected modifier will be active for may be determined during play of the base or primary game, determined based on the amount wagered or determined in any other suitable manner. In one embodiment, the number of subsequent reel spins associated with each modifier is displayed to the player. In another embodiment, the number of subsequent reel spins associated with a plurality of the modifiers are displayed to the player. In another embodiment, the number of subsequent reel spins associated with each modifier is not displayed to the player.

In one embodiment, each modifier is selected and activated by a modifier generator. In one embodiment, the modifier generator is a modifier reel, similar to the plurality of reels and preferable located adjacent to one of the plurality of reels. In this embodiment, once the modifier generator is activated (i.e., by a modifier activator symbol displayed on an active payline on one of the stopped reels), the gaming device enables the player to cause the modifier generator to generate or select at least one modifier by spinning the modifier reel.

In an alternative embodiment, each time the reels spin, the modifier generator spins or otherwise generates or selects at least one modifier. In another embodiment, each time the reels spin, if at least one modifier is not currently activated, then the modifier generator spins or otherwise generates or selects at least one modifier. In this embodiment, if at least one modifier activator symbol is displayed on at least one active payline on at least one of the stopped reels, then the generated or selected modifier is activated. If at least one modifier activator symbol is not displayed on at least one active payline on at least one of the stopped reels, then the generated or selected modifier is not activated.

In one embodiment, more than one modifier may be active for at least one reel spin. That is, at least two modifiers may both be active for a plurality of reel spins, wherein each active modifier alters or changes at least one game function, parameter or game outcome of the reel game. In this embodiment, if a first modifier is active and on a subsequent reel spin, a second modifier is activated (i.e., by the player obtaining a modifier activator symbol on the stopped reels and a modifier being selected as described above), then for at least one subsequent reel spin, both the first modifier and the second modifier will be active. For example, if a first modifier is activated for ten subsequent reel spins and on the fourth subsequent spin, a second modifier is activated for twelve subsequent reel spins, then for the next six reel spins (i.e., the last six active spins of the first modifier and the first six active spins of the second modifier), both the first modifier and the second modifier will be activated. For these next six reel spins, at least two functions (i.e., at least one function for the first modifier and at least one function for the second modifier) of the reel game will be modified.

In an alternative embodiment, the modifiers to be activated are determined by the player. In this embodiment, rather than the gaming device selecting which modifier that will be activated for a subsequent plurality or number of reel spins as described above, the player is enabled to pick or select which modifiers to activate. In this embodiment, if the player obtains a modifier activator symbol on an active payline on at least one of the reels, then at least one and preferably a plurality of the modifiers are indicated or displayed to the player. As described above, each modifier alters or changes at least one parameter, function or outcome associated with the reels for a plurality of subsequent reel spins. The gaming device enables the player to pick or select which of the indicated modifiers to activate. The player's picked modifier is then activated for at least one and preferably a plurality of subsequent reel spins as described above. In this embodiment, a counter is associated with each of the displayed modifiers. Each counter displays the number of subsequent reel spins that it's associated modifier will remain activated.

The present invention provides a player with a new and exciting game that uses reels wherein an outcome obtained in one primary game sequence may influence an outcome obtained in a plurality of subsequent primary games.

BRIEF DESCRIPTION OF DRAWINGS

The invention will now be described further by way of example only and with reference to the accompanying drawings in which.

MODES FOR CARRYING OUT THE INVENTION

Figure 1A:
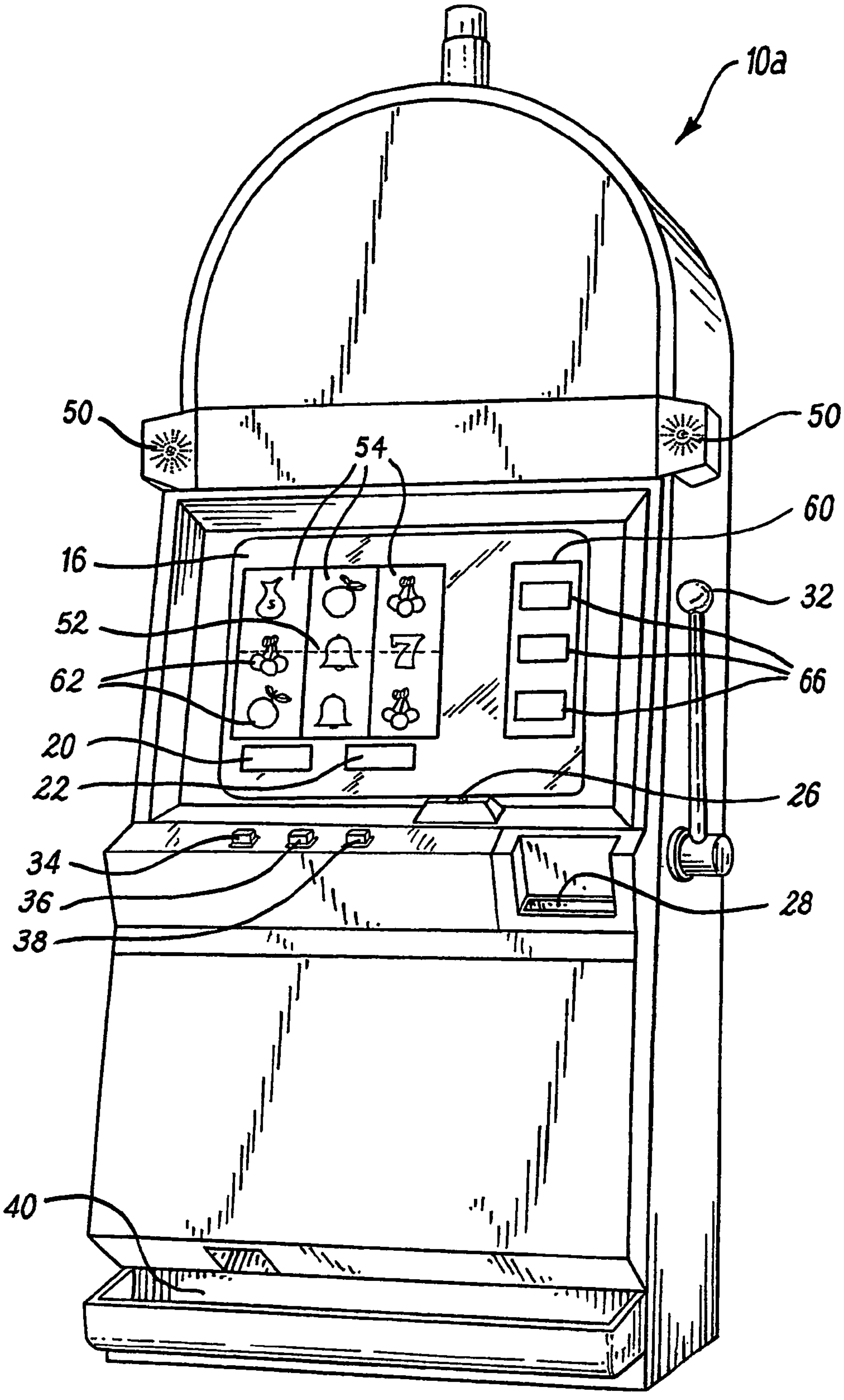
FIG. 1A is a front-side perspective view of one embodiment of the gaming device of the present invention.
Figure 1B:
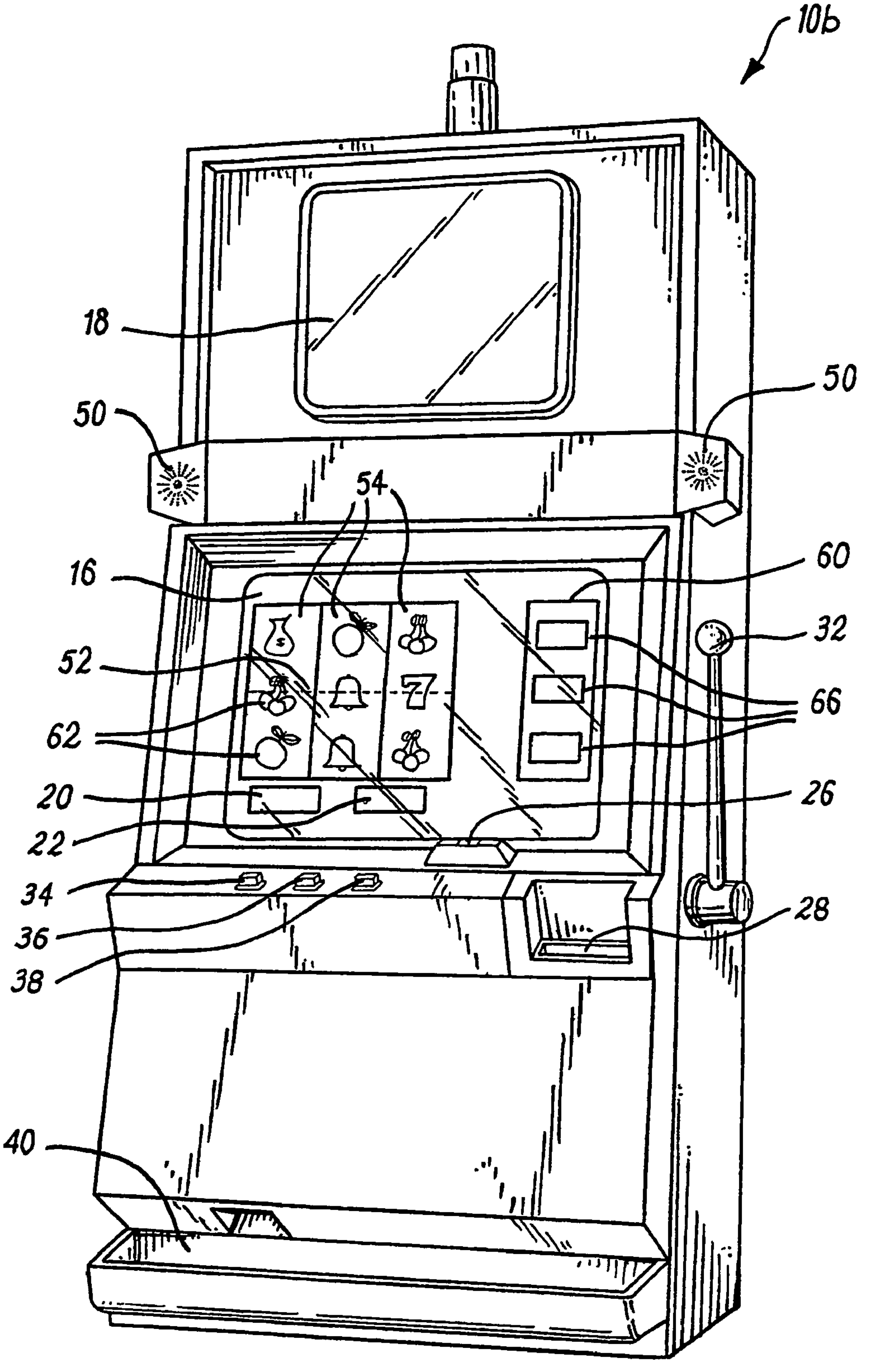
FIG. 1B is a front-side perspective view of another embodiment of the gaming device of the present invention.

Referring now to the drawings, two alternative embodiments of the gaming device of the present invention are illustrated in FIGS. 1A and 1B as gaming device 10*a* and gaming device 10*b*, respectively. Gaming device 10*a* and/or gaming device 10*b* are generally referred to herein as gaming device 10.

In one embodiment, as illustrated in FIGS. 1A and 1B, gaming device 10 has a support structure, housing or cabinet which provides support for a plurality of displays, inputs, controls and other features of a conventional gaming machine. It is configured so that a player can operate it while standing or sitting. The gaming device may be positioned on a base or stand or can be configured as a pub-style table-top game (not shown) which a player can operate preferably while sitting. As illustrated by the different configurations shown in FIGS. 1A and 1B, the gaming device can be constructed with varying cabinet and display configurations.

Figure 2A:
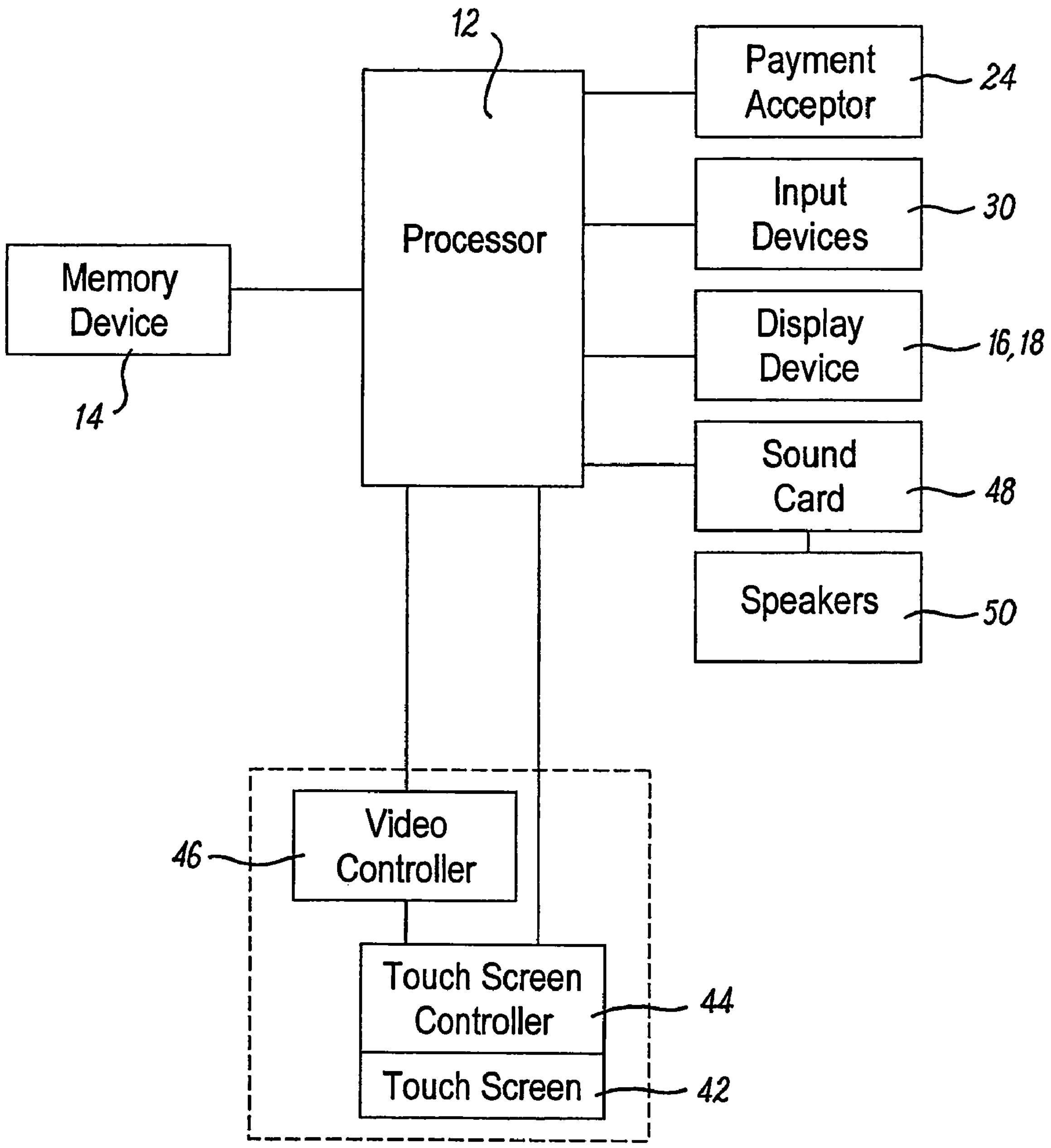
FIG. 2A is a schematic block diagram of the electronic configuration of one embodiment of the gaming device of the present invention.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information and applicable game rules that relate to the play of the gaming device. In one embodiment, the memory device includes random access memory (RAM). In one embodiment, the memory device includes read only memory (ROM). In one embodiment, the memory device includes flash memory and/or EEPROM (electrically erasable programmable read only memory). Any other suitable magnetic, optical and/or semiconductor memory may be implemented in conjunction with the gaming device of the present invention.

In one embodiment, part or all of the program code and/or operating data described above can be stored in a detachable or removable memory device, including, but not limited to, a suitable cartridge, disk or CD ROM. A player can use such a removable memory device in a desktop, a laptop personal computer, a personal digital assistant (PDA) or other computerized platform. The processor and memory device may be collectively referred to herein as a "computer" or "controller."

In one embodiment, as discussed in more detail below, the gaming device randomly generates awards and/or other game outcomes based on probability data. That is, each award or other game outcome is associated with a probability and the gaming device generates the award or other game outcome to be provided to the player based on the associated probabilities. In this embodiment, since the gaming device generates outcomes randomly or based upon a probability calculation, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device removes the provided award or other game outcome from the predetermined set or pool. Once removed from the set or pool, the specific provided award or other game outcome cannot be provided to the player again. This type of gaming device provides players with all of the available awards or other game outcomes over the course of the play cycle and guarantees the amount of actual wins and losses.

In one embodiment, as illustrated in FIG. 2A, the gaming device includes one or more display devices controlled by the processor. The display devices are preferably connected to or mounted to the cabinet of the gaming device. The embodiment shown in FIG. 1A includes a central display device 16 which displays a primary game. This display device may also display any secondary game associated with the primary game as well as information relating to the primary or secondary game. The alternative embodiment shown in FIG. 1B includes a central display device 16 and an upper display device 18. The upper display device may display the primary game, any suitable secondary game associated with the primary game and/or information relating to the primary or secondary game. As seen in FIGS. 1A and 1B, in one embodiment, gaming device includes a credit display 20 which displays a player's current number of credits, cash, account balance or the equivalent. In one embodiment, gaming device includes a bet display 22 which displays a player's amount wagered.

The display devices may include, without limitation, a monitor, a television display, a plasma display, a liquid crystal display (LCD) a display based on light emitting diodes (LED) or any other suitable electronic device or display mechanism.

In one embodiment, as described in more detail below, the display device includes a touch-screen with an associated touch-screen controller. The display devices may be of any suitable configuration, such as a square, rectangle, elongated rectangle.

The display devices of the gaming device are configured to display at least one and preferably a plurality of game or other suitable images, symbols and indicia such as any visual representation or exhibition of the movement of objects such as mechanical, virtual or video reels and wheels, dynamic lighting, video images, images of people, characters, places, things and faces of cards, tournament advertisements and the like.

In one alternative embodiment, the symbols, images and indicia displayed on or of the display device may be in mechanical form. That is, the display device may include any electromechanical device, such as one or more mechanical objects, such as one or more rotatable wheels, reels or dice, configured to display at least one and preferably a plurality of game or other suitable images, symbols or indicia.

As illustrated in FIG. 2A, in one embodiment, the gaming device includes at least one payment acceptor 24 in communication with the processor. As seen in FIGS. 1A and 1B, the payment acceptor may include a coin slot 26 and a payment, note or bill acceptor 28, where the player inserts money, coins or tokens. The player can place coins in the coin slot or paper money, ticket or voucher into the payment, note or bill acceptor. In other embodiments, devices such as readers or validators for credit cards, debit cards or credit slips could be used for accepting payment. In one embodiment, a player may insert an identification card into a card reader of the gaming device. In one embodiment, the identification card is a smart card having a programmed microchip or a magnetic strip coded with a player's identification, credit totals and other relevant information. In one embodiment, money may be transferred to a gaming device through electronic funds transfer. When a player funds the gaming device, the processor determines the amount of funds entered and the corresponding amount is shown on the credit or other suitable display as described above.

As seen in FIGS. 1A, 1B and 2A, in one embodiment the gaming device includes at least one and preferably a plurality of input devices 30 in communication with the processor. The input devices can include any suitable device which enables the player to produce an input signal which is read by the processor. In one embodiment, after appropriate funding of the gaming device, the input device is a game activation device, such as a pull arm 32 or a play button 34 which is used by the player to start any primary game or sequence of events in the gaming device. The play button can be any suitable play activator such as a bet one button, a max bet button or a repeat the bet button. In one embodiment, upon appropriate funding, the gaming device begins the game play automatically. In another embodiment, upon the player engaging one of the play buttons, the gaming device automatically activates game play.

In one embodiment, as shown in FIGS. 1A and 1B, one input device is a bet one button 36. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 38. The player may push the cash out button and cash out to receive a cash payment or other suitable form of payment corresponding to the number of remaining credits. In one embodiment, when the player cashes out, the player receives the coins or tokens in a coin payout tray 40. In one embodiment, when the player cashes out, the player may receive other payout mechanisms such as tickets or credit slips redeemable by a cashier or funding to the player's electronically recordable identification card.

In one embodiment, as mentioned above and seen in FIG. 2A, one input device is a touch-screen 42 coupled with a touch-screen controller 44, or some other touch-sensitive display overlay to allow for player interaction with the images on the display. The touch-screen and the touch-screen controller are connected to a video controller 46. A player can make decisions and input signals into the gaming device by touching touch-screen at the appropriate places.

The gaming device may further include a plurality of communication ports for enabling communication of the processor with external peripherals, such as external video sources, expansion buses, game or other displays, an SCSI port or a key pad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as playing music for the primary and/or secondary game or for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized for or to provide any appropriate information.

In one embodiment, the gaming machine may include a player or other sensor, such as a camera in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in either an analog, digital or other suitable format. The display devices may be configured to display the image acquired by the camera as well as display the visible manifestation of the game in split screen or picture-in-picture fashion. For example, the camera may acquire an image of the player and that image can be incorporated into the primary and/or secondary game as a game image, symbol or indicia.

Figure 2B:
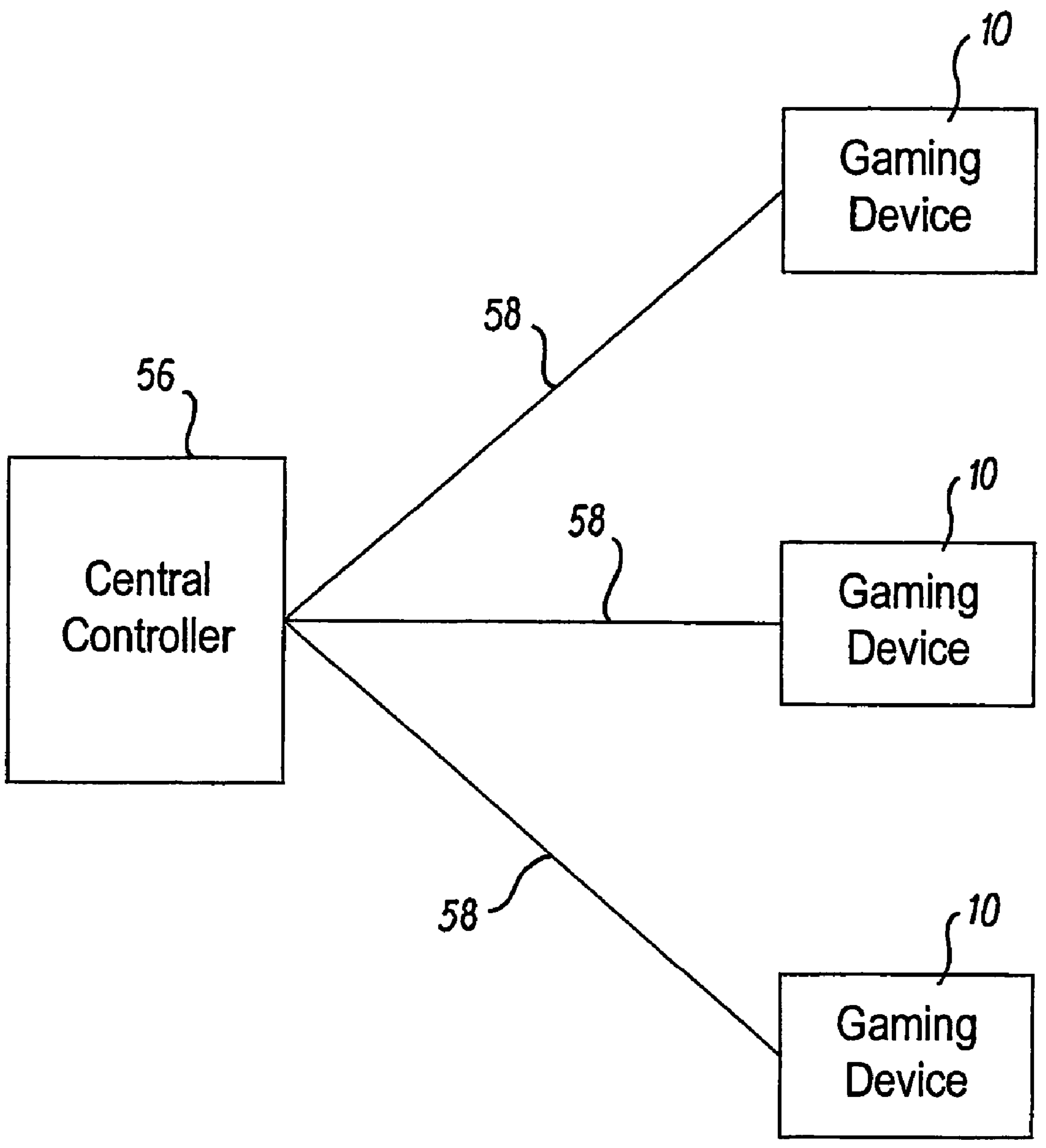
FIG. 2B is a schematic block diagram illustrating a plurality of gaming terminals in communication with a central controller.

In one embodiment, as illustrated in FIG. 2B, one or more of the gaming devices 10 of the present invention may be connected to each other through a data network or a remote communication link 58 with some or all of the functions of each gaming device provided at a central location such as a central server or central controller 56. More specifically, the processor of each gaming device may be designed to facilitate transmission of signals between the individual gaming device and the central server or controller.

In one embodiment, the game outcome provided to the player is determined by a central server or controller and provided to the player at the gaming device of the present invention. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such a free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility and the like.

In another embodiment, one or more of the gaming devices of the present invention are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

A plurality of the gaming devices of the present invention are capable of being connected together through a data network. In one embodiment, the data network is a local area network (LAN), in which one or more of the gaming devices are substantially proximate for each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system of the present invention may be substantially identical to the LAN gaming system described above, although the number of gaming devices in each system may vary relative to each other.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital signal line (DSL), T-1 line, coaxial cable, fiber optic cable, or other suitable connection. In this embodiment, players may access an Internet game page from any location where an internet connection and computer, or other internet facilitator are available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications according to the present invention, particularly if such communications are encrypted. Higher data transmission speeds may be useful for enhancing the sophistication and response of the display and interaction with the player.

In another embodiment, a plurality of gaming devices at one or more gaming sites may be networked to a central server in a progressive configuration, as known in the art, wherein a portion of each wager to initiate a base or primary game may be allocated to bonus or secondary event awards. In one embodiment, a host site computer is coupled to a plurality of the central servers at a variety of mutually remote gaming sites for providing a multi-site linked progressive automated gaming system. In one embodiment, a host site computer may serve gaming devices distributed throughout a number of properties at different geographical locations including, for example, different locations within a city or different cities within a state.

In one embodiment, the host site computer is maintained for the overall operation and control of the system. In this embodiment, a host site computer oversees the entire progressive gaming system and is the master for computing all progressive jackpots. All participating gaming sites report to, and receive information from, the host site computer. Each central server computer is responsible for all data communication between the gaming device hardware and software and the host site computer.

Gaming device 10 can incorporate any suitable wagering primary or base game. The gaming machine or device of the present invention may include some or all of the features of conventional gaming machines or devices. The primary or base game may comprise any suitable reel-type game, card game, number game or other game of chance susceptible to representation in an electronic or electromechanical form which produces a random outcome based on probability data upon activation from a wager. That is, different primary wagering games, such as video poker games, video blackjack games, video Keno, video bingo or any other suitable primary or base game may be implemented into the present invention. It should be appreciated that regardless of the primary game implemented with the present invention, the primary game will include at least one modifier that, if activated in the primary game, will alter or change at least one parameter, function or outcome associated with the primary game for at least one and preferable a plurality of subsequent plays of the primary game, as discussed in more detail below.

In one embodiment, in addition to winning credits in a base or primary game, the gaming device may also give players the opportunity to win credits in a bonus or secondary game or bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game and is accompanied with more attractive or unusual features than the base or primary game.

In one embodiment, the bonus or secondary game may be any type of suitable game, either similar to or completely different from the base or primary game. In one embodiment, the gaming device includes a program which will automatically begin a bonus round when the player has achieved a triggering event or qualifying condition in the base or primary game. In one embodiment, the triggering event or qualifying condition may be a selected outcome in the primary game or a particular arrangement of one or more indicia on a display device in the primary game, such as a particular symbol appearing on three adjacent reels along a payline in a slot game. In another embodiment, the triggering event or qualifying condition may be by exceeding a certain amount of game play (number of games, number of credits, amount of time), reaching a specified number of points earned during game play or as a random award.

In one embodiment, once a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or geometric increase in the number of bonus wagering credits awarded. In one embodiment, extra bonus wagering credits may be redeemed during the bonus game to extend play of the bonus game.

In one embodiment, no separate entry fee or buy in for a bonus game need be employed. That is, a player may not purchase an entry into a bonus game; he must win or earn entry through play of the primary game and, thus, play of the primary game is encouraged. In another embodiment, qualification of the bonus or secondary game could be accomplished through a simple "buy in" by the player if, for example, the player has been unsuccessful at qualifying through other specified activities.

In one embodiment, a base or primary game may be a poker game wherein the gaming device enables the player to play a conventional game of video poker and initially deals five cards all face up from a virtual deck of fifty-two card deck. Cards may be dealt as in a traditional game of cards or in the case of the gaming device, may also include that the cards are randomly selected from a predetermined number of cards. If the player wishes to draw, the player selects the cards to hold via one or more input device, such as pressing related hold buttons or via the touch screen. The player then presses the deal button and the unwanted or discarded cards are removed from the display and replacement cards are dealt from the remaining cards in the deck. This results in a final five-card hand. The final five-card hand is compared to a payout table which utilizes conventional poker hand rankings to determine the winning hands. The player is provided with an award based on a winning hand and the credits the player wagered.

In another embodiment, the base or primary game may be a multi-hand version of video poker. In this embodiment, the player is dealt at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand and awards are provided to the player. In these embodiments, at least one of the cards is associated with a modifier activator. If the player is dealt one of the cards associated with a modifier activator, then a modifier that alters or changes at least one function of the primary game is activated for at least one and preferably a plurality of subsequent dealt hands. For example, if the cards with a rank of two are each associated with a modifier activator and the player is dealt the two of spades, then a modifier is activated for a plurality of subsequent dealt hands. In one embodiment, the modifier may alter or change the payout associated with one or more winning hands for a plurality of subsequently dealt hands.

In one embodiment, a base or primary game may be a keno game wherein the gaming device displays a plurality of selectable indicia or numbers on at least one of the display devices. In this embodiment, the player selects at least one and preferable a plurality of the selectable indicia or numbers via an input device or via the touch screen. The gaming device then displays a series of drawn numbers to determine an amount of matches, if any, between the player's selected numbers and the gaming device's drawn numbers. The player is provided an award based on the amount of matches, if any, based on the amount of determined matches. In this embodiment, at least one of the indicia or numbers is associated with a modifier activator. In one embodiment, if the player selects one of the indicia or numbers associated with a modifier activator, then a modifier that alters or changes at least one function of the keno game for at least one and preferably a plurality of subsequent keno games is activated as described in more detail below. In another embodiment, if the gaming device draws one of the indicia or numbers associated with a modifier activator, then a modifier is activated for a plurality of subsequent keno games. In another embodiment, if the player selects one of the indicia or numbers associated with a modifier activator or the if the gaming device draws one of the indicia or numbers associated with a modifier activator, then a modifier is activated for a plurality of subsequent keno games.

Primary Reel Game

In one embodiment, as illustrated in FIGS. 1A, 1B and 3A to 3E, a base or primary game may be a slot game with one or more paylines 52. The paylines may be horizontal, vertical, circular, diagonal, angled or any combination thereof. In this embodiment, the gaming device displays at least one and preferably a plurality of reels 54, such as three to five reels in either electromechanical form with mechanical rotating reels or video form with simulated reels and movement thereof. In one embodiment, an electromechanical slot machine includes a plurality of adjacent, rotatable wheels which may be combined and operably coupled with an electronic display of any suitable type. In another embodiment, if the reels are in video form, the plurality of simulated video reels are displayed on one or more of the display devices as described above. Each reel displays a plurality of indicia or symbols 62 such as bells, hearts, fruits, numbers, letters, bars or other images which preferably correspond to a theme associated with the gaming device. In this embodiment, the gaming device awards prizes when the reels stop spinning if specified types and/or configurations of indicia or symbols occur on an active payline or otherwise occur in a winning pattern.

Figure 3A:
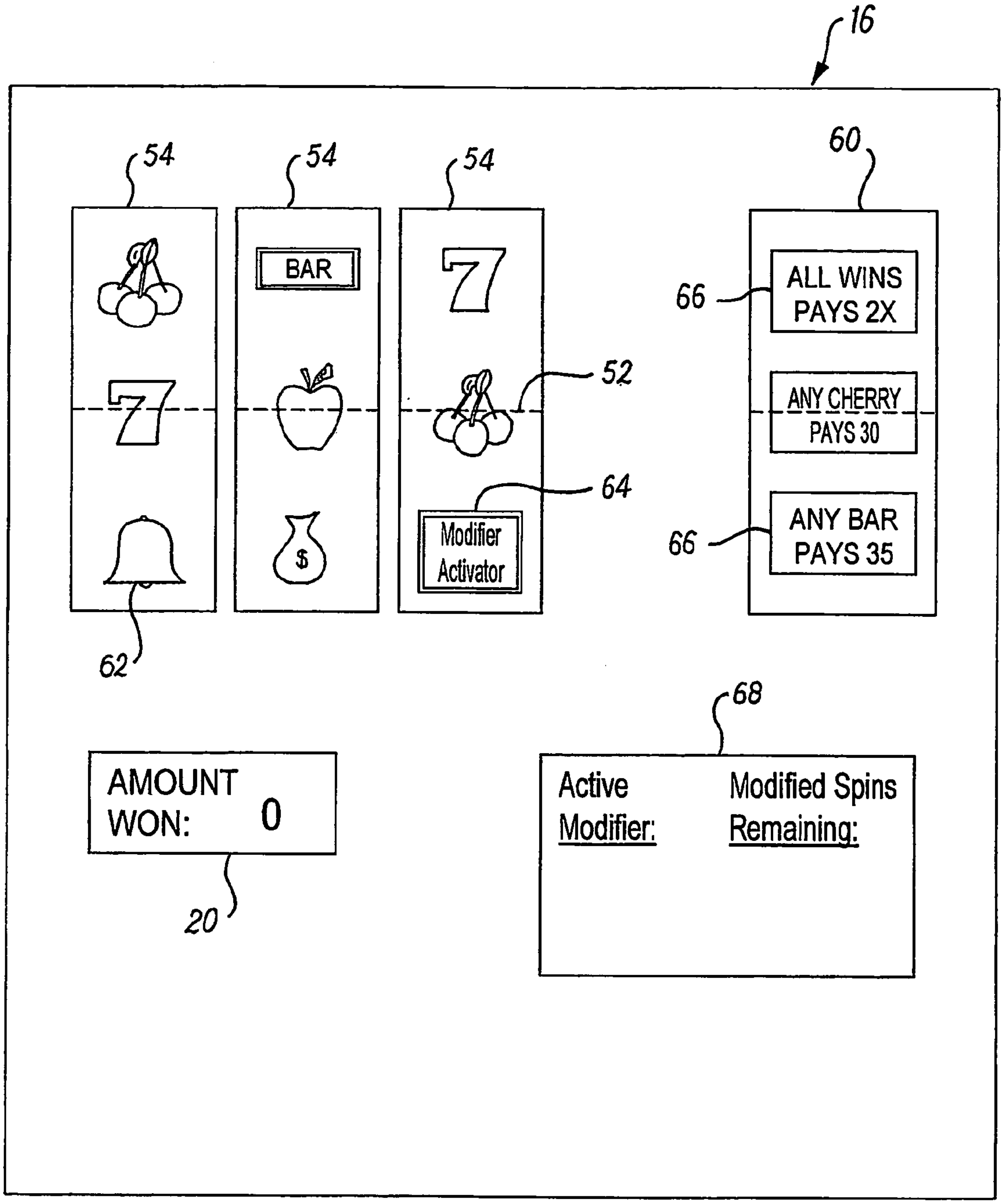
FIGS. 3A, 3B, 3C, 3D and 3E are front elevational views of one embodiment of the present invention illustrating a modifier obtained during one play sequence that influences the outcomes obtained in a subsequent play sequence.

As illustrated in FIG. 3A, at least one and preferably a plurality of the reels include at least one modifier activator symbol 64. When at least one modifier activator symbol is displayed on an active payline 52, or alternatively is in view in the reel display area 64, the gaming device selects at least one of a plurality of modifiers 66. The gaming device activates the selected modifier for a plurality of subsequent reel spins. Each modifier alters or changes at least one parameter, function or outcome associated with the slot game for at least one and preferably a plurality of subsequent reel spins. That is, a modifier activated in one reel spin may influence the play of a plurality of subsequent reel spins. For example, different modifiers may alter or influence the prize or amount associated with one or more symbols or combinations of symbols on the plurality of reels for a plurality of subsequent reel spins. It should be appreciated that any suitable modification or alteration of the functions of the primary game may be implemented in accordance with the present invention.

As seen in FIG. 3A, in one embodiment, one modifier is an "ALL WINS PAYS 2×" modifier that doubles the amount of the award or prize associated with each of the winning symbols or combinations of symbols that can be obtained on the plurality of reels for at least one subsequent reel spin. Another modifier is a "ANY BAR PAYS 35" modifier that modifiers the amount or prize provided to the player when one or more "BAR" symbols is displayed on an active payline on at least one of the plurality of reels for at least one subsequent reel spin. Another modifier is a "ANY CHERRY PAYS 30" modifier that modifiers the amount or prize provided to the player when one or more "CHERRY" symbols is displayed on an active payline on at least one of the plurality of reels for at least one subsequent reel spin. It should be appreciated that with the "ANY BAR PAYS 30" modifier and the "ANY CHERRY PAYS 30" modifier, the amount or prize provided to the player if any "BAR" symbol or any "CHERRY" symbol is displayed on the reels is in addition to any other prize or amount provided to the player for any winning symbol or combination of symbols on the reels.

Each modifier is associated with at least one and preferably a plurality of subsequent reel spins that the modifier will be active for. In one embodiment, each modifier is associated with the same number of subsequent reel spins. In another embodiment, a plurality of the modifiers are associated with different numbers of subsequent reel spins. In another embodiment, the number of subsequent reel spins that the selected modifier will be active for is predetermined or randomly determined. In another embodiment, the number of subsequent reel spins that the selected modifier will be active for may be determined during play of the base or primary game, determined based on the amount wagered or determined in any other suitable manner. In one embodiment, the number of subsequent reel spins associated with each modifier is displayed to the player. In another embodiment, the number of subsequent reel spins associated with a plurality of the modifiers are displayed to the player. In another embodiment, the number of subsequent reel spins associated with each modifier is not displayed to the player.

In one embodiment, the modifiers are selected by a modifier generator 60 which includes the plurality of modifiers 66. In one embodiment, the modifier generator is at least one electromechanical or simulated reel 60 located adjacent to the plurality of reels 54. In another embodiment (not shown), the modifier generator is a simulated or electromechanical rotatable wheel which has a plurality of modifiers and an indicator such as an arrow or pointer that indicates the selected modifier. In another embodiment (not shown), the modifier generator may be an electromechanical or simulated die with a different modifier represented on each face. It should be appreciated that any other suitable mechanism operable to generate or select a modifier may be implemented in accordance with the present invention.

The gaming device includes an active modifier counter or indicator 68 associated with each modifier that displays which modifier, if any, is currently activated and the number of subsequent spins that the activated modifier, if any, will remain activated. Moreover, the credit display 20 displays the amount of credits the player has won for a given combination of symbols on the reels.

Figure 3B:
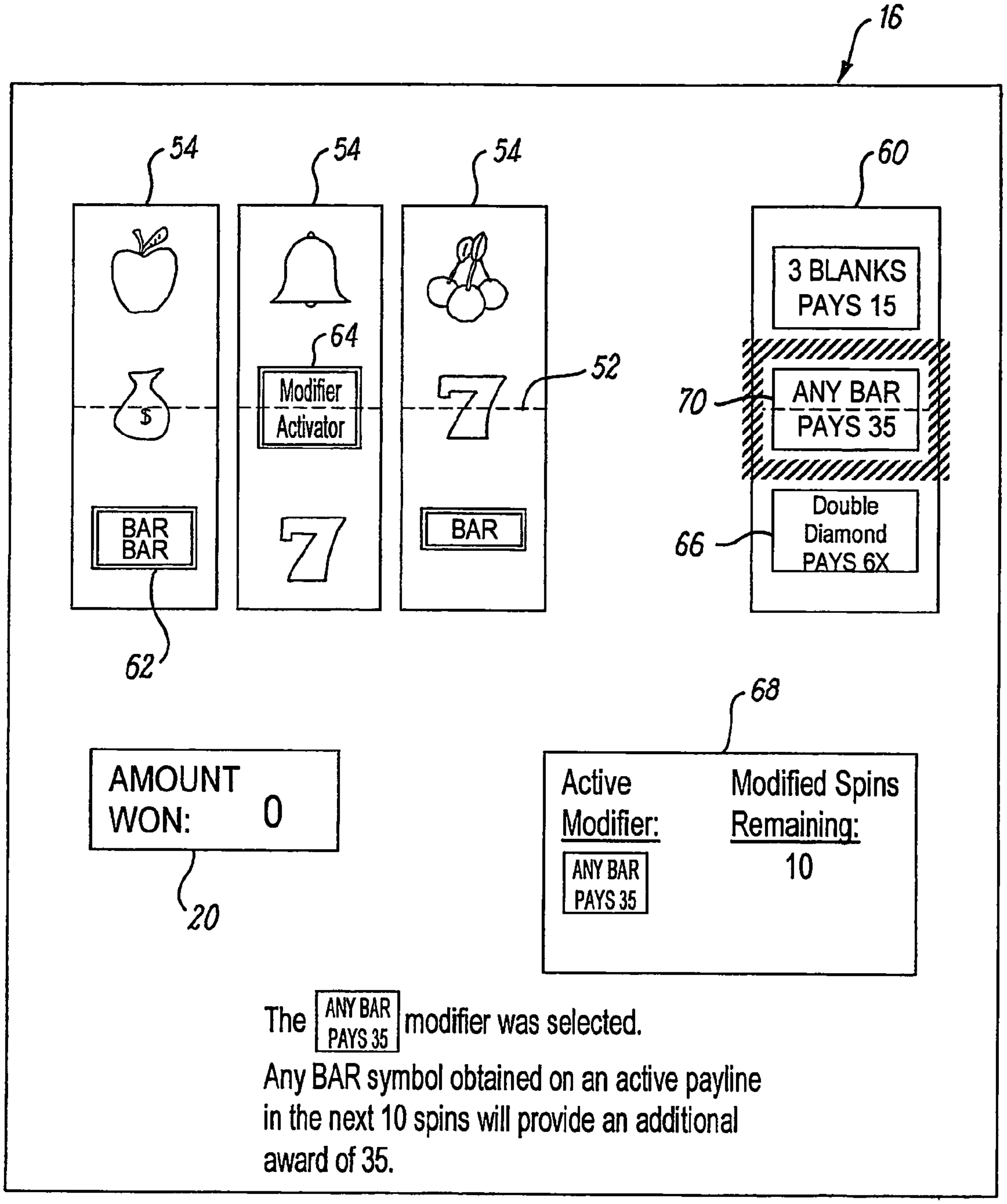

As illustrated in FIG. 3B, in one embodiment, upon an appropriate wager, the gaming device enables the player to cause the spinning of the plurality of reels (using the pull arm 32 or the play button 34) and provides an award based on the symbols or combinations of symbols that occur or are displayed on one or more active paylines. In this case, although the combination of symbols on the reels is not associated with any award (as indicated by the "O" displayed by the credit display 20), since a modifier activator symbol 64 occurred on an active payline on one of the reels, the gaming device selects at least one modifier that will alter or change at least one function of the reel game for at least one and preferably a plurality of subsequent reel games. In another embodiment, the gaming device selects a plurality of modifiers that will each alter or change at least one function of the reel game for at least one and preferably a plurality of subsequent reel games.

In this embodiment, as seen in FIG. 3B, the modifier generator is activated to select at least one modifier. In one embodiment, once activated, the gaming device enables the player to cause the spinning of the modifier generator and when the modifier generator stops spinning, the modifier that is displayed on the active payline of the modifier generator is activated for a plurality of subsequent reel spins. In another embodiment, the gaming device spins the activated modifier generator without any player involvement. In this case, the highlighted "ANY BAR PAYS 35" modifier 70 (which is associated with ten subsequent reel spins) is displayed on the active payline of the modifier generator and is thus activated for ten subsequent spins. That is, if any "BAR" symbols is displayed on any active payline during any of the next ten reel spins, an award of thirty-five will be provided to the player for each occurrence. Accordingly, the active modifier counter 68 indicates that the "ANY BAR PAYS 35" modifier is activate and will remain activate for ten subsequent reel spins. Appropriate messages such as "THE ANY BAR PAYS 35 MODIFIER WAS SELECTED" and "ANY BAR SYMBOL OBTAINED ON AN ACTIVE PAYLINE IN THE NEXT 10

SPINS WILL PROVIDE AN ADDITIONAL AWARD OF 35" are preferably provided to the player visually or through suitable audio or audiovisual displays.

In an alternative embodiment (not shown), each time the plurality of reels spin, the modifier generator also spins to generate or select at least one modifier. In another embodiment, each time the plurality of reels spin, if at least one modifier is not activated, the modifier generator also spins to generate or select at least one modifier. In this embodiment, if at least one modifier activator symbol is displayed on an active payline of at least one stopped reel, then the generated or selected modifier will be activated for each of a plurality of subsequent plays or sequences of the reel game. If at least one modifier activator symbol is not displayed on an active payline of at least one stopped reel, then the generated modifier will, not be activated for each of a plurality of subsequent plays or sequences of the reel game. In one embodiment, the plurality of reels and the modifier generator spin simultaneously. In another embodiment, the plurality of reels and the modifier generator spin sequentially.

Figure 3C:
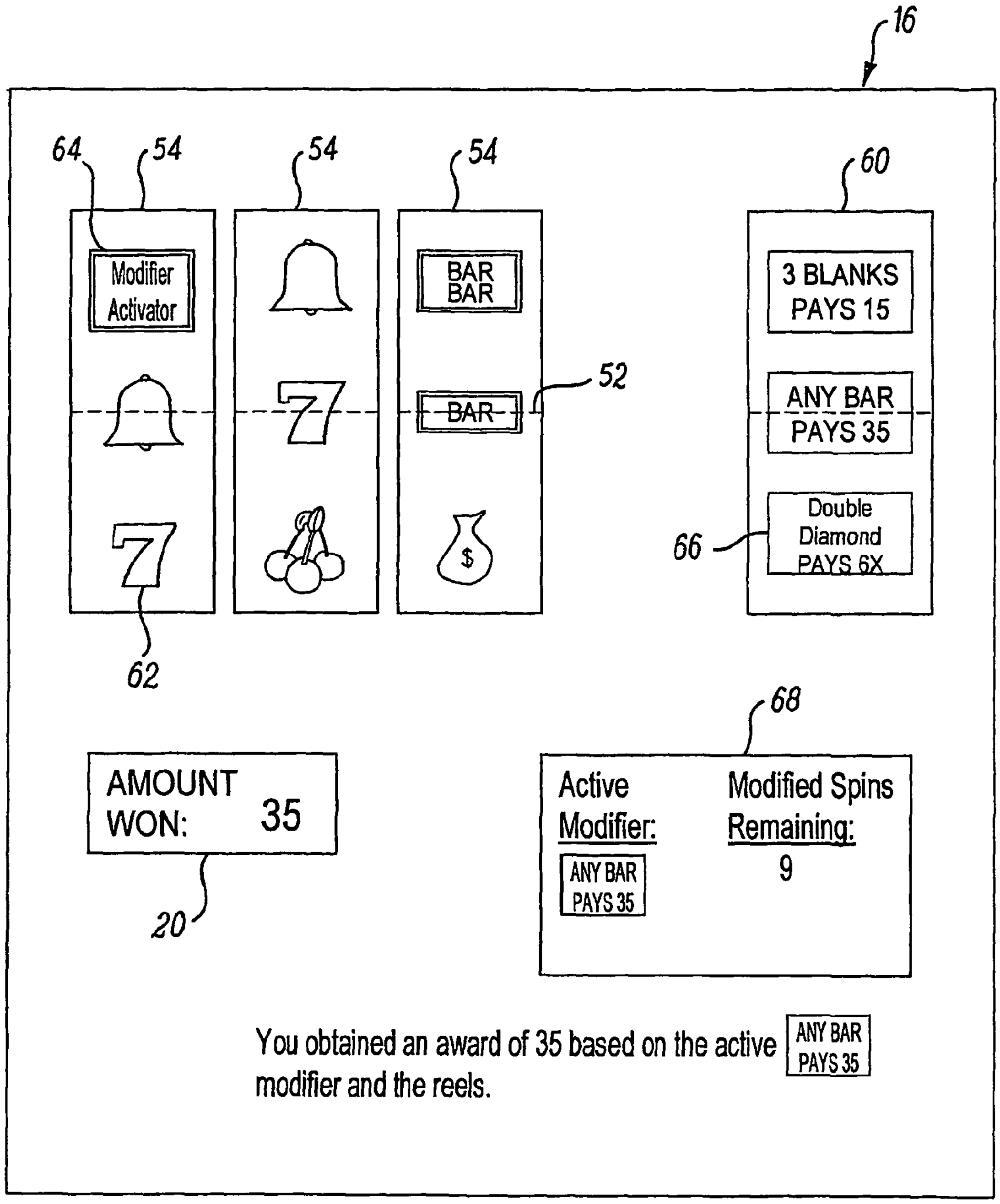

As illustrated in FIG. 3C, upon an appropriate wager, the gaming device enables the player to cause the spinning of the plurality of reels and provides an award based on the symbols or combinations of symbols that occur or are displayed on one or more active paylines. In this embodiment, as a single "BAR" symbol occurred on one of the active paylines and the prior selected active "ANY BAR PAYS 35" modifier is applied to alter the prize or amount associated with each of the "BAR" symbols obtained, the gaming device provides the player a prize or amount of thirty-five credits based on the obtained single "BAR" symbol. The credit display 20 is updated to reflect this provided prize and the active modifier counter 68 is updated to indicate that the active "ANY BAR PAY 35" modifier will remain active for nine subsequent reel spins. In this case, since a modifier activator symbol was not displayed on an active payline, the modifier generator is not caused to spin to select another modifier. It should be appreciated that had the "ANY BAR PAYS 35" modifier not been active, the player would not have obtained an award based on the single "BAR" symbol because, in the unmodified state of the game, the single "BAR" symbol is not associated with a prize or award. Appropriate messages such as "YOU OBTAINED AN AWARD OF 35 BASED ON THE ACTIVE "ANY BAR PAYS 35 MODIFIER" AND THE REELS" are preferably provided to the player visually or through suitable audio or audiovisual displays.

In one embodiment, the player is provided an additional award of thirty-five for each occurrence of a "BAR" symbol on an active payline. That is, if the reels display a single "BAR" symbol and a double "BAR" symbol (each on an active payline), then the player will be provided an award of seventy (i.e., thirty-five for each "BAR" symbol occurrence). In another embodiment, if at least one "BAR" symbol occurs on an active payline, then the player is provided an award of thirty-five regardless of if there are more than one "BAR" symbols on the reels. That is, even if the reels display a single "BAR" symbol and a double "BAR" symbol (each on an active payline), then the player will be provided an award of thirty-five for the occurrence of a "BAR" symbol. In an alternative embodiment, one "BAR" symbol may provide an award greater than thirty-five. For example, a double "BAR" symbol (on an active payline) may count as two "BAR" symbols and thus provide the player an additional award of seventy. Moreover, a triple "BAR" symbol (on an active payline) may count as three "BAR" symbols and thus may provide the player an additional award of one-hundred and five.

Figure 3D:
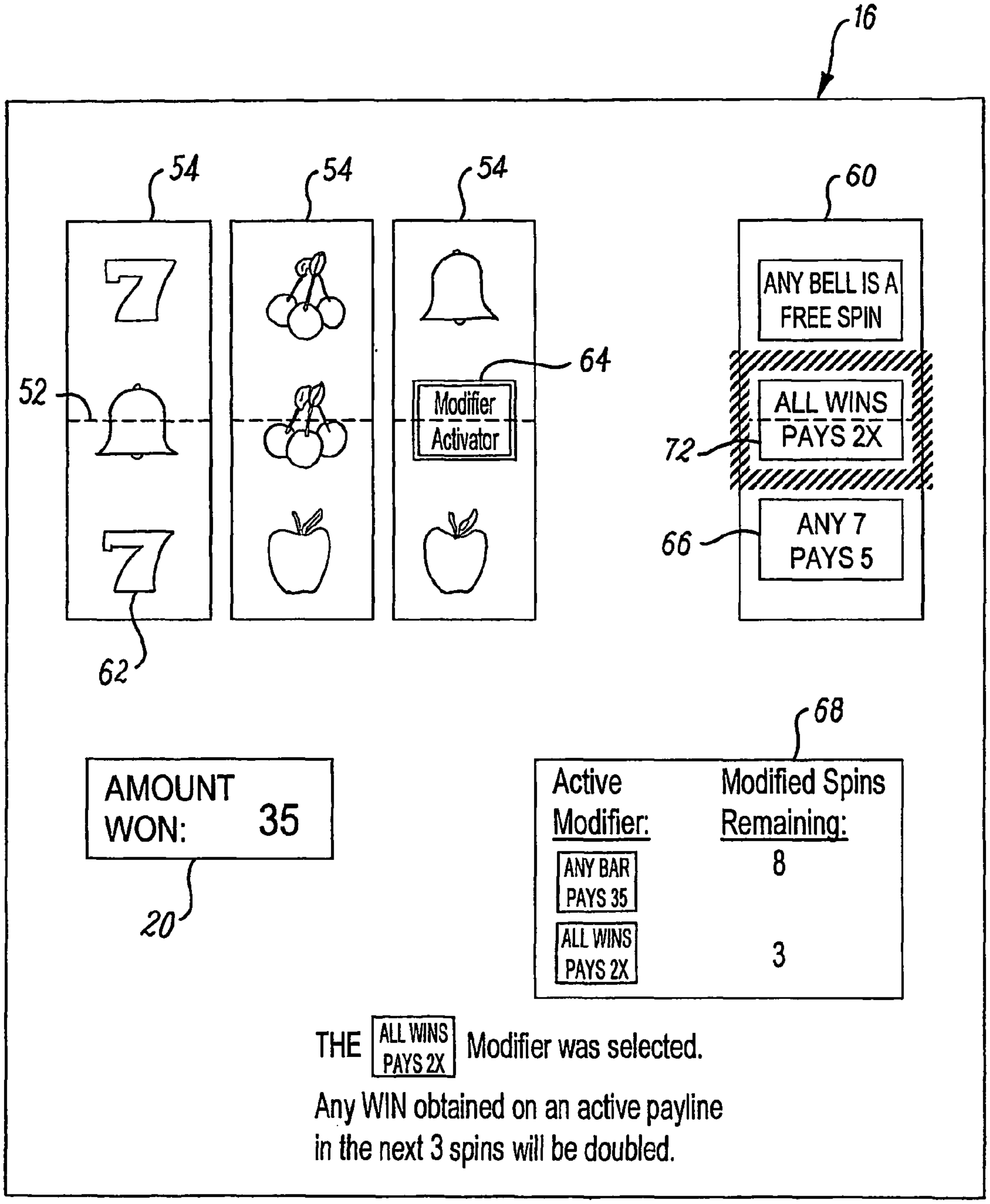

As illustrated in FIG. 3D, upon an appropriate wager, the gaming device enables the player to cause the spinning of the plurality of reels and provides an award based on the symbols or combinations of symbols that occur or are displayed on one or more active paylines. In this case, the gaming device did not provide any award to the player based on the combination of symbols on the reels, but the gaming device did activate the modifier generator because a modifier activator symbol occurred on an active payline. Accordingly, the modifier generator selected and activated the highlighted "ALL WINS PAYS 2×" modifier 72 for three subsequent reel spins. Accordingly, the active modifier counter 68 indicates that the "ALL WINS PAY 2×" modifier is activated and will remain active for three subsequent reel spins. Moreover, the active modifier counter is updated to indicate that the active "ANY BAR PAY 35" modifier will remain activate for eight subsequent reel spins. Appropriate messages such as "THE ALL WINS PAYS 2× MODIFIER WAS SELECTED" and "ANY WIN OBTAINED ON AN ACTIVE PAYLINE IN THE NEXT 3 SPINS WILL BE DOUBLED" are preferably provided to the player visually or through suitable audio or audiovisual displays.

In an alternative embodiment, no more than one modifier may be active at the same time. In this embodiment, if a first modifier is active and on a subsequent reel spin a second modifier is selected (i.e., a modifier activator symbol is displayed on one of the stopped reels), then the second modifier is stored or otherwise put on hold until the first modifier is no longer active. For example, if the first modifier is activated for four subsequent reel spins and on the third reel spin, a second modifier is selected, then the second modifier is stored by the gaming device and not activated for one more reel spin or until the first modifier is no longer active. Once the first modifier is no longer active, then the second modifier is activated for a plurality of subsequent reel spins.

In another alternative embodiment, if a first modifier is active and on a subsequent reel spin, a second modifier is selected and activated, then the player or gaming device must pick which of the two modifiers will remain active. For example, if a first modifier is activated for six subsequent reel spins and on the second subsequent reel spin, a second modifier is activated for eight subsequent reel spins, then the player must decide which of the two modifiers will remain active. It should be appreciated that in this embodiment, the player must weigh the function that each modifier alters with the number of subsequent reel spins that each modifier will be active for. That is, in this example, even though the first modifier, if selected, would remain active for four subsequent spins (as opposed to eight subsequent spins if the second modifier is selected), if the modified function associated with the first modifier is significantly better than the modified function associated with the second modifier, then the player may select to keep the first modifier activated.

In one embodiment, once a modifier is activated for a plurality of reel spins, that modifier cannot be selected again (i.e., if a modifier activator symbol is displayed on the stopped reels) until the first number of reel spins is complete. In other words, once activated, a modifier cannot be reselected and reactivated for any subsequent reel spins until the modifier is no longer active. For example, if a first modifier is activated for ten subsequent reel spins, then that active first modifier cannot be selected again for at least the next ten reel spins. It should be appreciated that, as described above, in one embodiment, another modifier may be selected and activated during the ten subsequent reel spins that the first modifier is active.

In another embodiment, an active modifier can be reselected and reactivated for at least one additional subsequent reel spin regardless of if the modifier is already activated. For example, if a modifier is activated for ten subsequent reel spins and on the fifth subsequent reel spin, the same modifier is selected and reactivated for an additional ten subsequent reel spins, then the modifier will be activated for the next fifteen subsequent reel spins (the five spins remaining from the first activation and the ten spins obtained for the second activation).

Figure 3E:
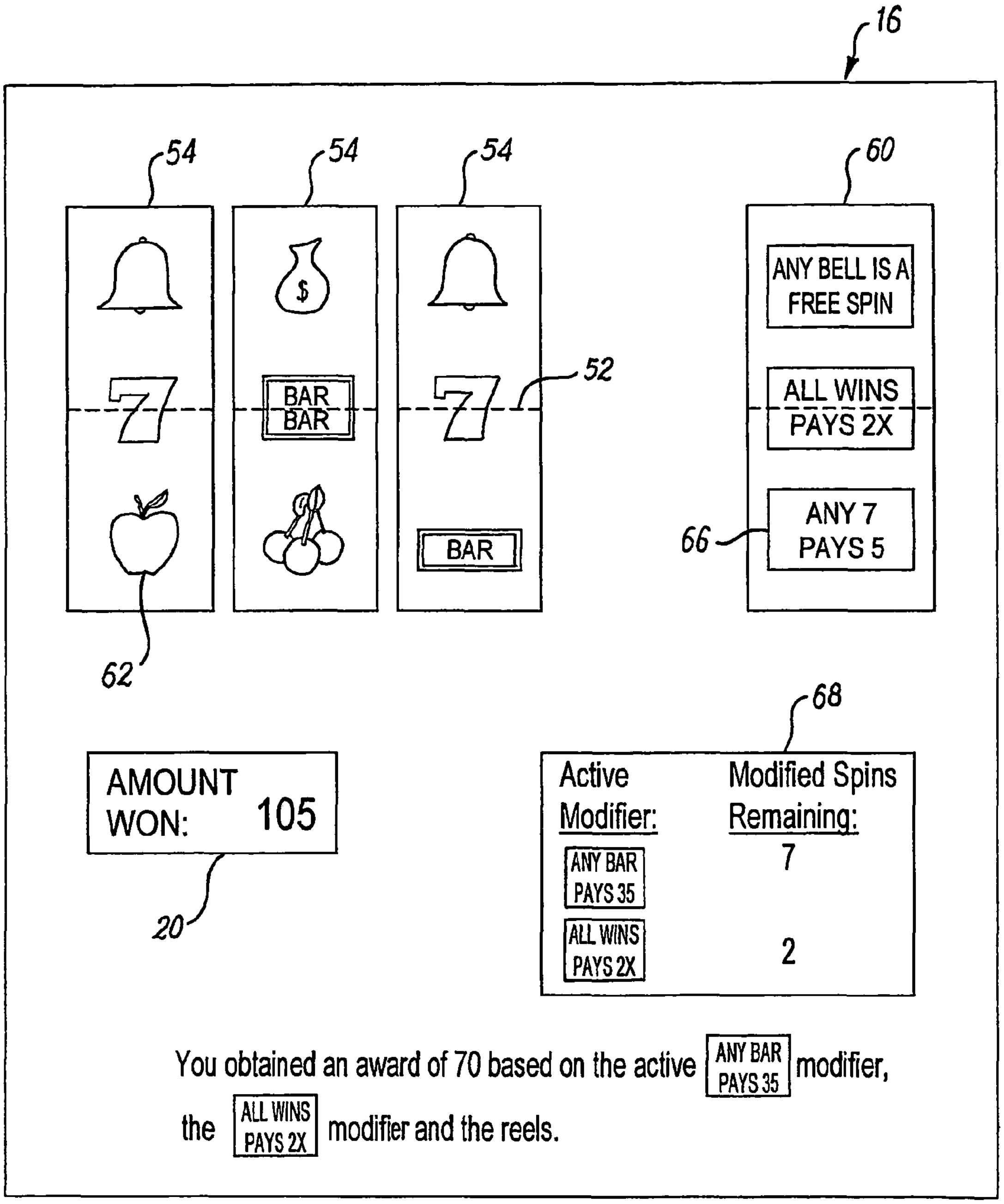

As illustrated in FIG. 3E, upon an appropriate wager, the gaming device enables the player to cause the spinning of the plurality of reels and provides an award based on the symbols or combinations of symbols that occur or are displayed on one or more active paylines. In this embodiment, as a double "BAR" symbol occurred on one of the active paylines and as the prior selected active "ANY BAR PAYS 35" modifier altered the prize or amount associated with each of the "BAR" symbols obtained, the gaming device provides the player a prize or amount of seventy credits based on the obtained double "BAR" symbol and the activated "ALL WINS PAYS 2×" modifier. That is, for this spin, two modifiers each influenced the prize or award provided to the player.

The credit display 20 is updated to one-hundred-five reflect this provided prize (i.e., this award plus the previous provided award of thirty-five). The active modifier counter 68 is updated to indicate that the active "ANY BAR PAY 35" modifier will remain active for seven subsequent reel spins and the active "ALL WINS PAYS 2×" modifier will remain active for two subsequent reel spins. In this case, since a modifier activator symbol was not displayed on an active payline, the modifier generator is not caused to spin to select another modifier. Appropriate messages such as "YOU OBTAINED AN AWARD OF 70 BASED ON THE ACTIVE "ANY BAR PAYS 35 MODIFIER," THE ACTIVE "ALL WINS PAYS 2×" MODIFIER AND THE REELS" are preferably provided to the player visually or through suitable audio or audiovisual displays.

Figure 4A:
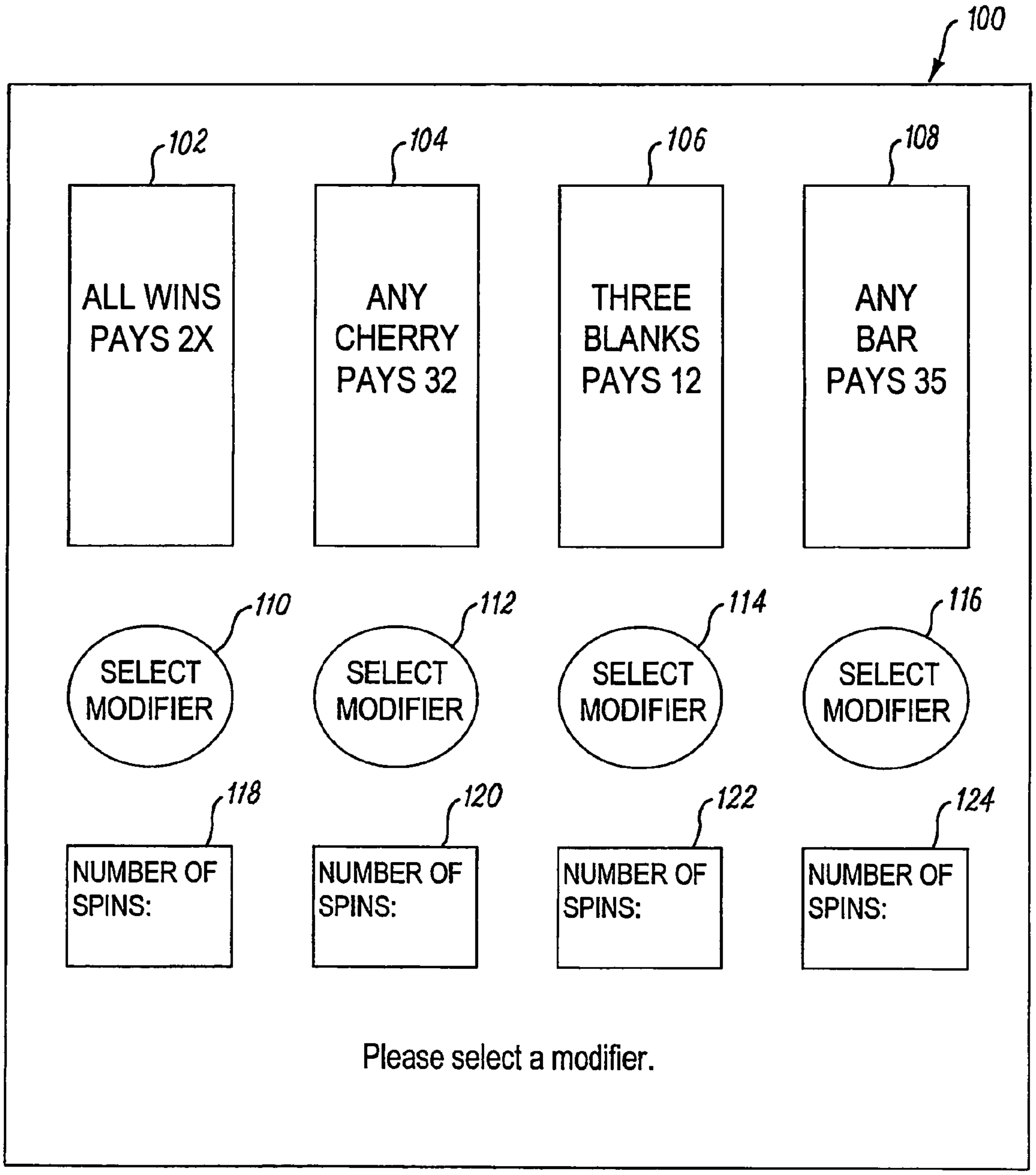
FIGS. 4A, 4B and 4C are front elevational view of an alternative embodiment of the present invention illustrating the gaming device enabling the player to select at least one modifier that will be active for at least one subsequent play sequence.
Figure 4B:
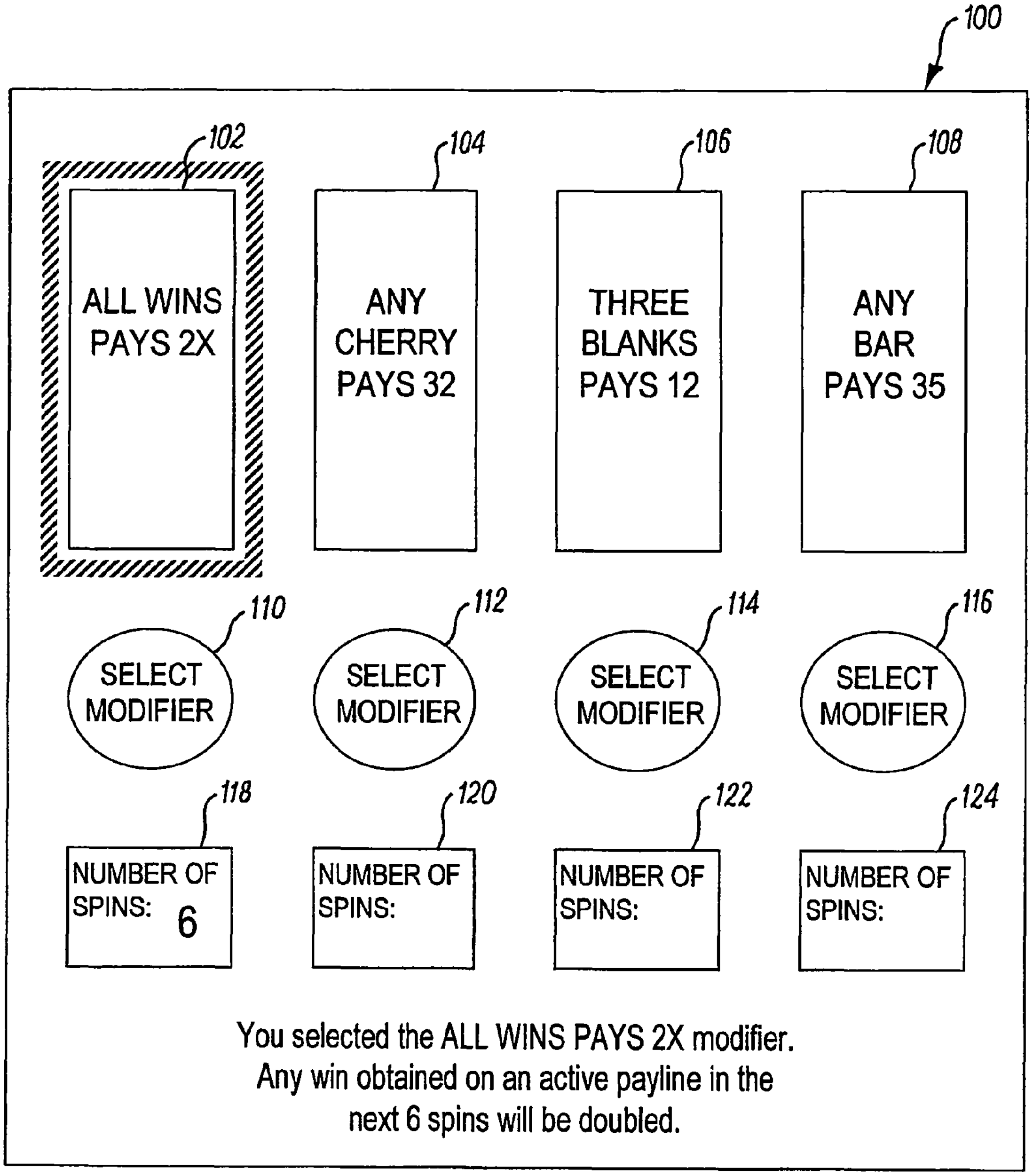
Figure 4C:
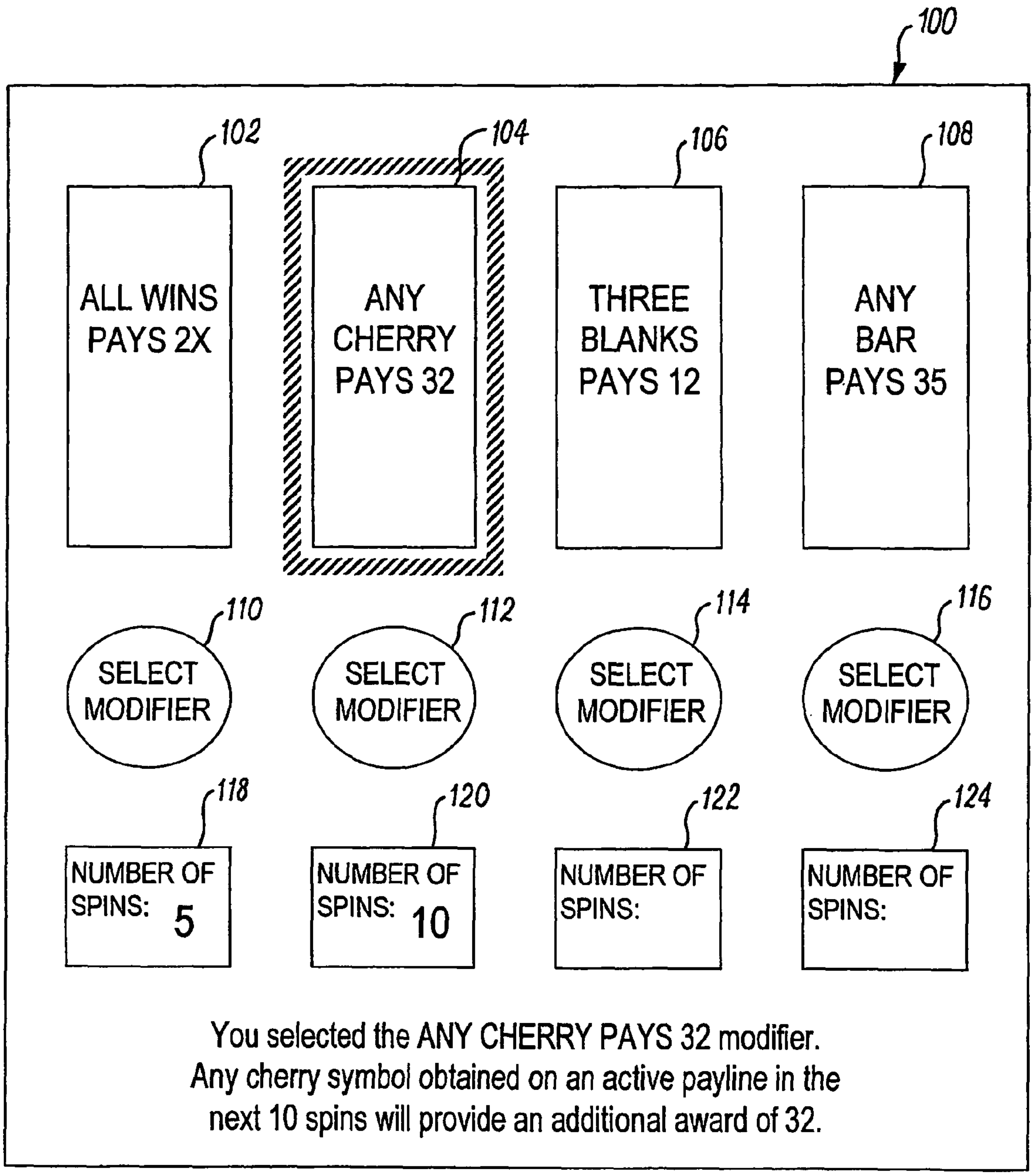

Referring to FIGS. 4A, 4B and 4C, in an alternative embodiment of the present invention, the modifiers to be activated are determined by the player. In this embodiment, the gaming device provides a screen or display 100 which enables the player to select one or more modifiers. As described above, each modifier alters or modifies at least one function, parameter or outcome of the primary wagering game for each of a plurality of subsequent plays of the primary wagering game. The gaming device displays a plurality of modifiers that are each associated with a different function, parameter or outcome of the primary wagering game. In this embodiment, the gaming device displays an "ALL WINS PAYS 2×" modifier, a "ANY CHERRY PAYS 32" modifier, a "THREE BLANKS PAYS 12" modifier and an "ANY BAR PAYS 35" modifier, respectively labeled 102, 104, 106 and 108. Each modifier is associated with a modifier selector that enables the player to select each modifier. In this embodiment, modifiers 102, 104, 106 and 108 are associated with modifier selectors 110, 112, 114 and 116 respectively. The gaming device also provides a counter or indicator associated with each modifier that illustrates the number of spins remaining once the modifier is activated. In this embodiment, modifiers 102, 104, 106 and 108 are associated with counters 118, 120, 122 and 124, respectively.

In this embodiment, as illustrated in FIG. 4A, upon at least one modifier activator occurring on an active payline, the gaming device enables the player to select one of the displayed modifiers that will be applied to each of a plurality of subsequent plays of the primary wagering game. Appropriate messages such as "PLEASE SELECT A MODIFIER" are preferably provided to the player visually or through suitable audio or audiovisual displays.

As illustrated in FIG. 4B, using the associated modifier selector 110, the player selected highlighted "ALL WINS PAYS 2×" modifier 102 that is associated with six subsequent spins. Therefore, for the next six reel spins, the award or prize associated with any symbol or combination of symbols is doubled. The appropriate number of six subsequent spins is displayed in the counter associated with the selected modifier 118. Appropriate messages such as "YOU SELECTED THE ALL WINS PAYS 2× MODIFIER" and "ANY WIN OBTAINED ON AN ACTIVE PAYLINE IN THE NEXT SIX SPINS WILL BE DOUBLED" are preferably provided to the player visually or through suitable audio or audiovisual displays.

As illustrated in FIG. 4C, if on the next spin of the reels, at least one modifier activator occurs on an active payline, the gaming device enables the player to select another one of the displayed modifiers. In this case, using the associated modifier selector 112, the player selected highlighted "ANY CHERRY PAYS 32" modifier 104 that is associated with the next ten spins. Therefore, for the next ten reel spins, for each "CHERRY" symbol that occurs on an active payline, the gaming device will provide the player an award or prize of thirty-two in additional to any other awards or prizes provided to the player. The appropriate number of ten subsequent spins is displayed in the counter associated with the selected modifier 120. It should be appreciated that the number of subsequent spins remaining for the previously selected modifier 102 is updated and displayed in the counter associated with the previously selected modifier 118 to reflect the subsequent spin of the reels. Appropriate messages such as "YOUR SELECTED THE ANY CHERRY PAYS 32 MODIFIER" and "ANY CHERRY SYMBOL OBTAINED ON AN ACTIVE PAYLINE IN THE NEXT 10 SPINS WILL PROVIDE AN ADDITIONAL AWARD OF 32" are preferably provided to the player visually or through suitable audio or audiovisual displays.

MODES FOR CARRYING OUT THE INVENTION

Figure 5:
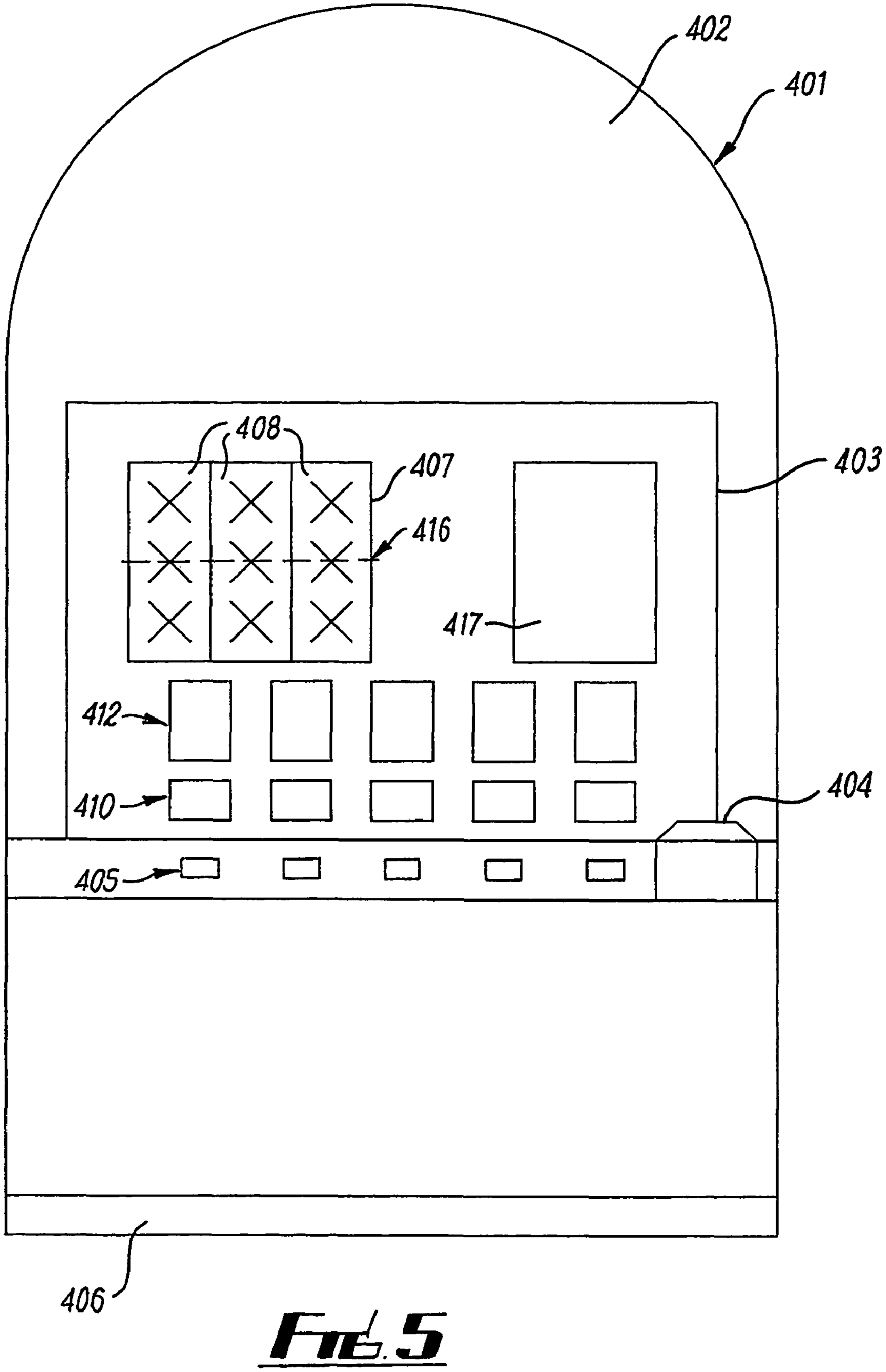
FIG. 5 is a diagrammatic front elevation of one form of a gaming machine according to a further embodiment of the invention.

Referring to FIG. 5, this shows a gaming machine in the form of a slot machine having a housing 401 with a front wall 402 having a main display panel 403, a coin slot 404, operating buttons 405, and a payout opening 406.

The main display panel 403 defines a window 407 through which the peripheries of three side by side reels 408 rotatably mounted about a common horizontal axis can be seen.

The reels are drivably mounted on respective stepper motors 409.

Figure 7:
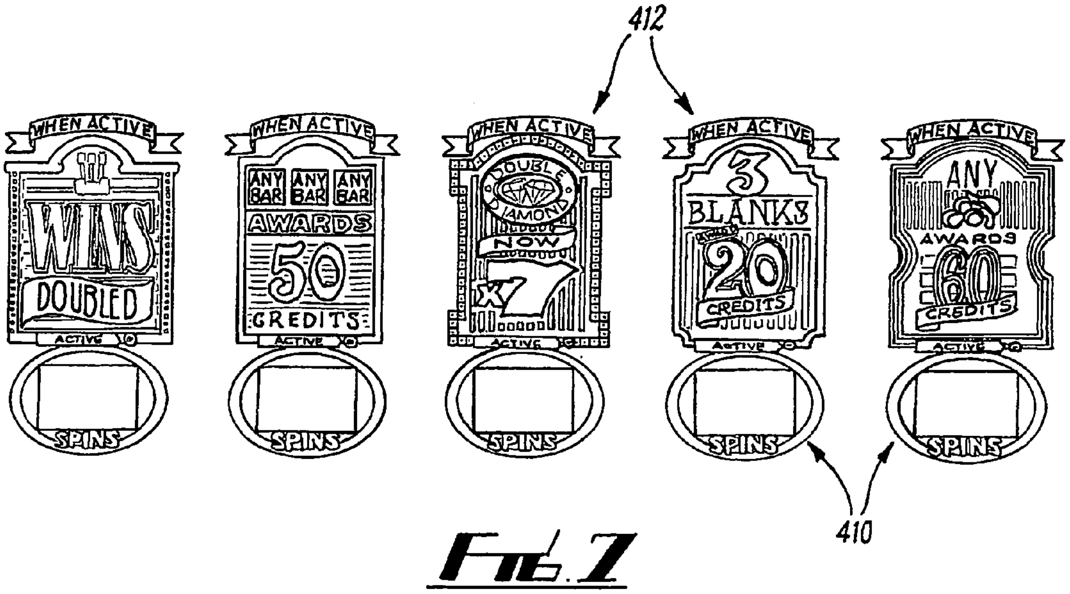
FIG. 7 shows an enlarged detailed view of a display region of the machine.

Beneath the window 407, as shown in FIG. 7, there are five small windows 410 through which can be seen respective LED or LCD alphanumeric displays 411. Immediately above each window 410 there is a printed indication 412 of a respective bonus event.

Figure 6:
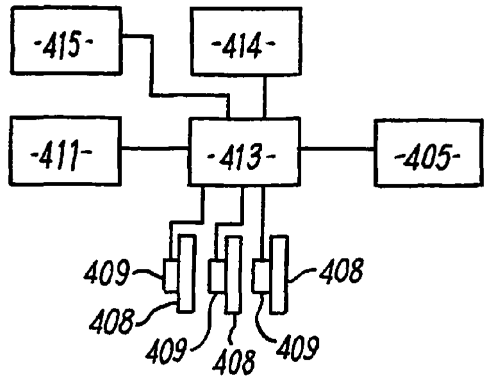
FIG. 6 is a block circuit diagram of the machine.

As shown in FIG. 6, the motors 409 are connected to a microprocessor based control unit 413 within the housing as also is a coin mechanism 414 linked to the slot 404, a payout mechanism 415 leading to the opening 416, the operating buttons 415, and the alphanumeric displays 411.

The reels 408 have symbol bands around their peripheries which are printed with symbols at equally spaced intervals, say at 420 or 424 positions. The symbols may include 'bars' (3 bar, 2 bar, 1 bar), blanks, the number 7 coloured red, and 'cherry' symbols.

The stepper motors 409 index the reels 408 step by step to bring the symbols successively into sight in the window 407 as a moving display. When at rest each reel 408 has one symbol on a central win line 416 and two further symbols can be seen above and below this symbol. Alternatively, at rest, only one symbol may be visible in the window 407 on the win line 416 for each reel 408.

The combination of three symbols on the win line 416 is matched, at the end of a game, with a list of predetermined winning combinations shown on a display 417 on the front panel 403.

In use, the player inserts coins into the slot 404 sufficient to provide credit for at least one game and a game can be played by pressing a start button 405. The reels 408 then rotate for different periods of time under the control of the unit 413 and come to rest to display on the win line 416 a randomly selected symbol combination.

This combination is assessed by the unit 413 and if it matched one of the predetermined winning combinations a predetermined prize award, as shown on the display 417 is made available to the player and can be paid out through the opening 406.

On occasions, as determined under the control of the unit 413, on a predetermined, random or pseudo random basis, the selected combination includes a special 'bonus event' symbol, or combination of such symbols, and this triggers availability of a bonus event selection procedure. The player can now select one of the five bonus events shown on the five indications 412, by means of the controls, e.g. by pressing a button under any one of the indications 412. This causes the respective alphanumeric display 411 to be actuated to show a predetermined number of games, say 410.

The player can now play 10 games, in the usual way after establishing credit for the games, but with the respective bonus event effective in each of the games.

As the games are played the alphanumeric display 411 decrements correspondingly to zero and the bonus event then terminates.

During play of the 10 games, a bonus event selection opportunity may again arise. The player can then select one of the bonus events. If the player selects a different bonus event, the respective alphanumeric display 411 shows 10 games. The two bonus events are now effective at the same time, until the 10 games are consumed for the first bonus event whereupon only the second event is effective until the 10 games for that have been consumed.

It may be possible for any number of bonus events, up to all five, to be effective simultaneously.

The player also may have the opportunity of selecting the same event again before the 10 games have been consumed in relation to its first selection. In that case, an additional 10 games is credited and is shown on the alphanumeric display 411.

By way of example, and as shown in the drawing the five bonus events may be as follows:

All Wins Doubled
Any Bar Win Pays 50 Credits Minimum
Wild Symbol multiplies win ×7
Three Blanks Pay 20 Credits
Single Cherry Win Pays 60 Credits These bonus events all apply to enhancement of symbol selections of the reels.

With the above embodiment the player has the opportunity of increased interaction with symbol combination win determination and can plan a strategy effective over 10 or more future games.

This gives rise to enhanced player enjoyment.

Figure 8:
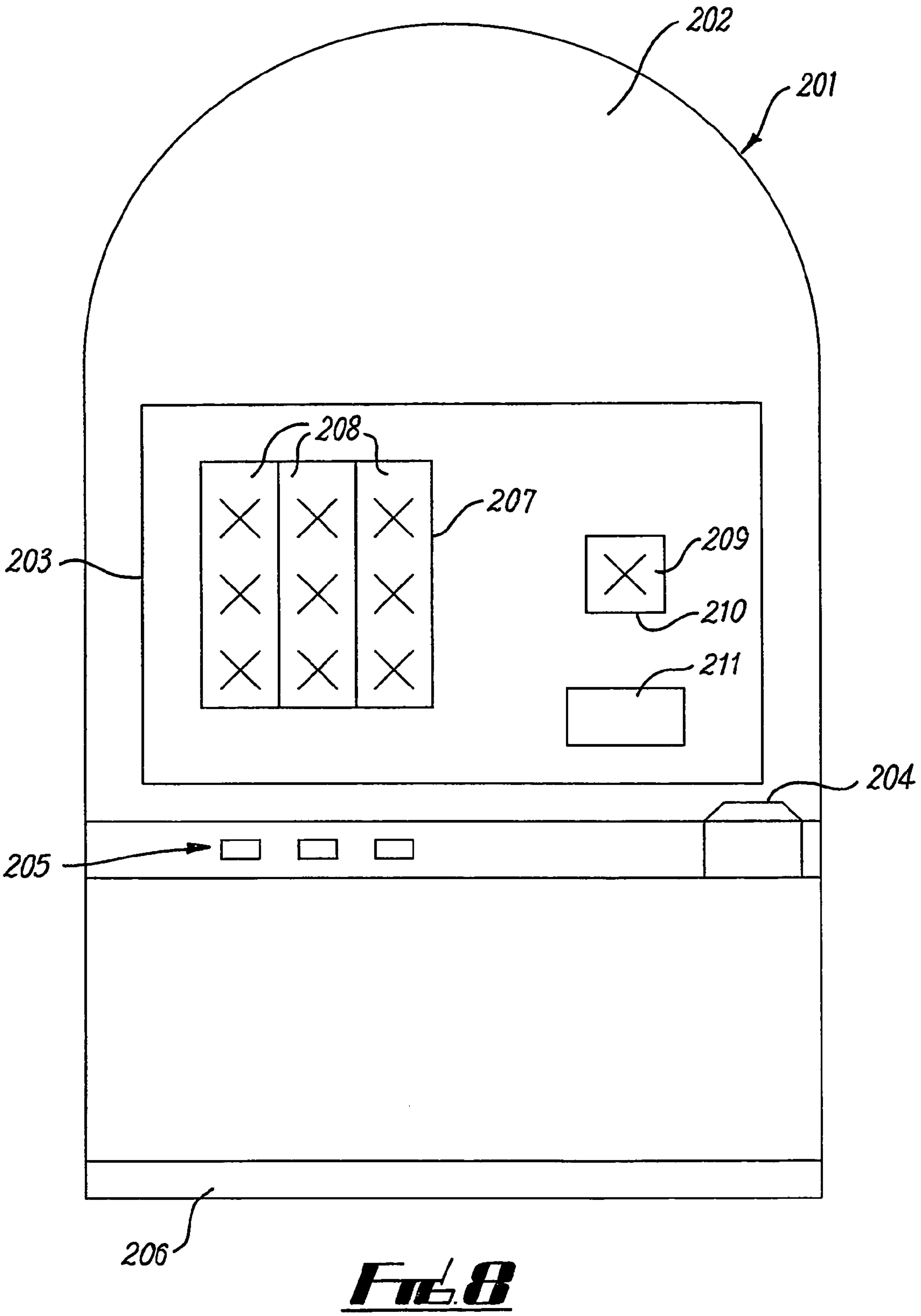
FIG. 8 is a diagrammatic front elevation of one form of a gaming machine in accordance with a further embodiment of the invention.

The gaming machine of FIG. 8 is a slot machine with a housing 201 with a front wall 202 having a main display panel 203, a coin slot 204, operating buttons 205, and a pay out opening 206.

The main display panel 203 defines a window 207 through which can be seen symbol-bearing peripheries of three side-by-side reels 208 which are rotatably mounted about a common horizontal axis.

A further symbol-bearing rotatable reel 209 can be seen through a further window 210.

In play of a game, after establishing credit, the reels 208 rotate and come to rest to display a combination of symbols on a win line in the window 207.

On occasions, when a special 'bonus event' symbol is displayed on one of the reels 208 on the win line a bonus event selection procedure is triggered. This causes the fourth reel 209 to rotate and then come to rest with one of the symbols on the reel 209 displayed through the window 207.

The symbols on the reel 209 represent bonus events, from a range of different such events, such as "all wins doubled" etc. This automatically selected bonus event now applies for a predetermined number of games, say ten games. That is, the player can now play ten games, after inserting adequate credit for ten games, and in each game the selected bonus event applies. At the end of the ten games, the bonus event no longer applies. A counter 211 decrements during game play.

It is of course to be understood that the invention is not intended to be restricted to the details of the above embodiments which are described by way of example only.

The invention claimed is:

1. A gaming device comprising:

at least one display device;

at least one input device;

at least one processor; and at least one memory device which stores a plurality of instructions, which when executed by the at least one processor, cause the at least one processor to operate with the at least one display device and the at least one input device to:

(a) display a primary game including a plurality of reels having a plurality of symbols, said symbols including at least one modifier activator symbol;

(b) activate the reels and display at least one of said symbols;

(c) provide any award based on the at least one displayed symbol;

(d) determine whether the modifier activator symbol is displayed on the reels;

(e) after the display of the modifier activator symbol, display:

(i) a plurality of different modifiers, and (ii) a modifier function associated with each of the displayed plurality of modifiers;

(f) after the modifier functions associated with the displayed plurality of modifiers are displayed, receive, from a player, a selection of one of the displayed plurality of modifiers;

(g) after the selection, reactivate the reels a plurality of times;

(h) automatically apply the modifier function associated with the player selected modifier to modify at least one function of the primary game for each one of said reactivations of the reels; and (i) after a winning outcome for at least one of the reactivations, provide an additional award based, at least in part, on the at least one modified function of the primary game.

2. The gaming device of claim 1, wherein a plurality of said symbols are modifier activator symbols.

3. The gaming device of claim 1, wherein the plurality of instructions, when executed by the at least one processor, cause the at least one processor to receive the selection from the player in response to a plurality of modifier activator symbols being displayed.

4. The gaming device of claim 1, wherein the plurality of instructions, when executed by the at least one processor, cause the at least one processor to operate with the at least one input device to receive, from the player, a second selection of a second one of the displayed plurality of modifiers.

5. The gaming device of claim 1, wherein the plurality of instructions, when executed by the at least one processor, cause the at least one processor to apply the modifier function associated with each of a plurality of player selected modifiers to modify a plurality of functions of the primary game.

6. The gaming device of claim 1, which includes an active modifier counter associated with each of the displayed plurality of modifiers, said active modifier counter being configured to indicate any current player selected modifier and a plurality of remaining subsequent activations of the reels that said current player selected modifier will be applied to.

7. The gaming device of claim 1, wherein the plurality of instructions, when executed by the at least one processor, cause the at least one processor to operate with the at least one input device to receive, from the player, the selection of one of the displayed plurality of modifiers if said modifier, activator symbol is displayed and no modifiers are currently activated.

8. The gaming device of claim 1, which includes a modifier generator displayed to the player that includes said displayed plurality of modifiers and said displayed modifier functions associated with the displayed plurality of modifiers.

9. The gaming device of claim 8, wherein the plurality of instructions, when executed by the at least one processor, cause the at least one processor to operate with the at least one input device and the modifier generator to receive, from the player, the selection of at least one of the displayed plurality of modifiers.

10. The gaming device of claim 8, wherein the plurality of instructions, when executed by the at least one processor, cause the at least one processor to operate with the at least one input device and the modifier generator to receive, from the player, the selection of one of the displayed plurality of modifiers if no modifiers are currently activated.

11. The gaming device of claim 10, wherein said player selected modifier is activated if said modifier activator symbol is displayed.

12. The gaming device of claim 8, wherein the plurality of instructions, when executed by the at least one processor, cause the at least one processor to operate with the at least one input device and the modifier generator to receive, from the player, another selection of one of the displayed plurality of modifiers.

13. The gaming device of claim 8, wherein said modifier generator includes a modifier reel.

14. The gaming device of claim 13, wherein said modifier reel is configured to spin if at least one modifier activator symbol is displayed on the reels.

15. The gaming device of claim 1, wherein the plurality of instructions, when executed by the at least one processor, cause the at least one processor to enable the player to select a plurality of the displayed plurality of modifiers.

16. The gaming device of claim 1, wherein each of the displayed plurality of modifiers is associated with a same plurality of subsequent activations of the reels.

17. The gaming device of claim 1, wherein a plurality of said displayed plurality of modifiers are each associated with different pluralities of subsequent activations of the reels.

18. The gaming device of claim 1, wherein the plurality of instructions, when executed by the at least one processor, cause the at least one processor to operate with the at least one display device to, for at least one of the reactivated reels:

(a) receive, from the player, a second input corresponding to an activation of at least one payline; and (b) for the at least one activated payline:

(i) apply the modifier function associated with the player selected modifier to at least one function of at least one symbol indicated by the player selected payline; and (ii) determine the additional award based on the modified function.

19. A gaming device comprising:

at least one display device;

at least one input device;

at least one processor; and at least one memory device which stores a plurality of instructions, which when executed by the at least one processor, cause the at least one processor to operate with the at least one display device and the at least one input device to:

(a) display a primary wagering game including a plurality of reels having a plurality of symbols, the symbols including at least one modifier activator symbol, the primary wagering game being associated with at least one award, the at least one award being associated with a winning condition;

(b) activate said plurality of reels to indicate at least one of the symbols;

(c) provide the at least one award as a result of the indicated symbol corresponding to the winning condition;

(d) determine whether the modifier activator symbol is indicated on the reels;

(e) after the indication of the modifier activator symbol, display:

(i) a plurality of modifiers, each of the displayed plurality of modifiers corresponding to a quantity of at least one subsequent activation of the reels, the quantity being greater than one for at least one of the displayed plurality of modifiers; and (ii) a modifier function associated with each of the displayed plurality of modifiers;

(f) after the display of the modifier functions associated with the displayed plurality of modifiers, receive, from a player, a selection of one of the displayed plurality of modifiers;

(g) after the selection, automatically perform the quantity of subsequent activations which correspond to the player selected modifier;

(h) apply the modifier function associated with the player selected modifier to modify, for each of the activated reels in each of the subsequent activations, at least one of:

(i) the at least one award, if any, based on at least one symbol indicated on the reels; and (ii) the winning condition of the primary wagering game; and (i) after an occurrence of the winning condition for at least one of the subsequent activations, provide an additional award based, at least in part, on the modification.

20. The gaming device of claim 19, wherein the triggering event is the player making a wager on the primary wagering game.

21. A gaming device comprising:

a display device;

at least one input device;

at least one processor; and at least one memory device which stores a plurality of instructions, which when executed by the at least one processor, cause the at least one processor to operate with the display device and the at least one input device to:

(a) display a primary wagering game operable upon a wager by a player, said primary wagering game including symbols, the symbols including at least one modifier activator symbol;

(b) operate the primary wagering game;

(c) display at least one of the symbols;

(d) determine whether the at least one modifier activator symbol is displayed;

(e) after the display of the at least one modifier activator symbol, display:

(i) a plurality of modifiers, each of the displayed plurality of modifiers corresponding to a quantity of at least one subsequent play of the primary wagering game, the quantity being greater than one for at least one of the displayed plurality of modifiers; and (ii) a modifier function associated with each of the displayed plurality of modifiers;

(f) after the display of the modifier functions associated with the displayed plurality of modifiers, receive, from a player, a selection of one of the displayed plurality of modifiers;

(g) after the selection, automatically activate the player selected modifier for at least one of the subsequent plays of the primary wagering game;

(h) operate the quantity of subsequent plays of the primary wagering game, said quantity corresponding to the player selected modifier;

(i) apply the modifier function associated with the player selected modifier to the primary wagering game for each of the quantity of subsequent plays of the primary wagering game; and (j) after a winning outcome for at least one of the subsequent plays of the primary wagering game, provide an additional award, the additional award being based, at least in part, on the player selected modifier.

22. The gaming device of claim 21, wherein a plurality of said symbols are modifier activator symbols.

23. The gaming device of claim 21, wherein the plurality of instructions, when executed by the at least one processor, cause the at least one processor to receive the selection from the player in response to a plurality of modifier activator symbols being displayed.

24. The gaming device of claim 21, wherein the plurality of instructions, when executed by the at least one processor, cause the at least one processor to operate with the at least one input device to receive, from the player, a second selection of a second one of the displayed plurality of modifiers.

25. The gaming device of claim 21, wherein the plurality of instructions, when executed by the at least one processor, cause the at least one processor to apply the modifier functions associated with each of a plurality of player selected modifiers to modify a plurality of functions of the primary wagering game.

26. The gaming device of claim 21, which includes an active modifier counter associated with each of the displayed plurality of modifiers, said active modifier counter being configured to indicate any current player selected modifier and a plurality of remaining subsequent plays of the primary wagering game that said current player selected modifier will be applied to.

27. The gaming device of claim 21, wherein the plurality of instructions, when executed by the at least one processor, cause the at least one processor to operate with the at least one input device to receive, from the player, the selection of one of the displayed plurality of modifiers if said modifier activator symbol is displayed and no modifiers are currently activated.

28. The gaming device of claim 21, which includes a modifier generator displayed to the player that includes said displayed plurality of modifiers and said displayed modifier functions associated with the displayed plurality of modifiers.

29. The gaming device of claim 28, wherein the plurality of instructions, when executed by the at least one processor, cause the at least one processor to operate with the modifier generator and the at least one input device to receive, from the player, the selection of at least one of the displayed plurality of modifiers.

30. The gaming device of claim 28, wherein the plurality of instructions, when executed by the at least one processor, cause the at least one processor to operate with the modifier generator and the at least one input device to receive, from the player, the selection of at least one of the displayed plurality of modifiers if no modifiers are currently activated.

31. The gaming device of claim 30, wherein said player selected modifier is activated if said modifier activator symbol is displayed.

32. The gaming device of claim 28, wherein the plurality of instructions, when executed by the at least one processor, cause the at least one processor to operate with the modifier generator and the at least one input device to receive, from the player, another selection of one of the displayed plurality of modifiers.

33. The gaming device of claim 28, wherein said modifier generator includes a modifier reel.

34. The gaming device of claim 33, wherein said modifier reel is configured to spin if the at least one modifier activator symbol is displayed on the reels.

35. The gaming device of claim 21, wherein the plurality of instructions, when executed by the at least one processor, cause the at least one processor to operate with the at least one input device to enable the player to select a plurality of the displayed plurality of modifiers.

36. The gaming device of claim 21, wherein each of the displayed plurality of modifiers is associated with a same plurality of subsequent plays of the primary wagering game.

37. The gaming device of claim 21, wherein a plurality of said displayed plurality of modifiers are each associated with different pluralities of subsequent plays of the primary wagering game.

38. A gaming system comprising:

at least one display device;

at least one input device;

at least one processor; and at least one memory device which stores a plurality of instructions, which when executed by the at least one processor, cause the at least one processor to operate with the at least one display device and the at least one input device to:

(a) receive an input based on a wager;

(b) operate a first play of a primary game, the primary game having a plurality of reels, the reels having a plurality of symbols, the symbols including at least one modifier symbol, at least one of the symbols being associated with a winning condition;

(c) generate a plurality of the symbols;

(d) provide an award as a result of the winning condition being satisfied;

(e) if the generated symbols include the at least one modifier symbol, activate a modifier generator, the modifier generator displaying:

(i) a plurality of modifiers, and (ii) a modifier function associated with each of the displayed plurality of modifiers;

(f) after the display of the modifier functions associated with the displayed plurality of modifiers, receive, from a player, a selection of one of the displayed plurality of modifiers;

(g) after the selection, automatically operate a second play of the primary game;

(h) modify, for the second play, based on the modifier function associated with the player selected modifier, at least one of:

(i) an award, if any, for the second play; and (ii) the winning condition of the primary game; and (i) after a winning outcome for the second play of the primary game, provide an additional award, the additional award being based, at least in part, on the modification of step (h).

39. The gaming system of claim 38, wherein the at least one function includes at least one primary game outcome.

40. The gaming system of claim 38, wherein the at least one function includes at least one primary game award.

41. A method of operating a gaming device, said method comprising:

(a) causing at least one processor to execute a plurality of instructions stored in at least one memory device to operate with at least one display device to display a game including a plurality of reels, wherein each of said reels includes a plurality of symbols, said plurality of symbols including a modifier activator symbol;

(b) causing the at least one processor to execute the plurality of instructions to activate said plurality of reels;

(c) causing the at least one processor to execute the plurality of instructions to cause a player to be provided with any award based on the symbols displayed on the reels after said activation;

(d) causing the at least one processor to execute the plurality of instructions to operate with the at least one display device to, after the display of the modifier activator symbol, display:

(i) a plurality of different modifiers, wherein at least one of said displayed plurality of modifiers is associated with a quantity of subsequent activations of the reels, the quantity being at least two; and (ii) a modifier function associated with each of the displayed plurality of modifiers;

(e) causing the at least one processor to execute the plurality of instructions to operate with at least one input device to, after the display of the modifier functions associated with the displayed plurality of modifiers, receive, from the player, a selection of one of the displayed plurality of modifiers, (f) causing the at least one processor to execute the plurality of instructions to repeat steps (b) to (c) at least the quantity of subsequent activations, wherein at least one function of the game is modified based on the modifier function associated with the player selected modifier; and (g) causing the at least one processor to execute the plurality of instructions to, for each of the subsequent activations of the reels, cause the player to be provided with an outcome, the outcome being based on, at least in part, the modification of the function of the game.

42. The method of claim 41, wherein a plurality of said symbols are modifier activator symbols.

43. The method of claim 41, which includes causing the at least one processor to execute the plurality of instructions to cause an indication of any of the displayed plurality of modifiers that is currently selected and the plurality of remaining subsequent activations of the reels that the player selected modifier will be applied to.

44. The method of claim 41, which includes causing the at least one processor to execute the plurality of instructions to operate with the at least one input device to enable the player to select a plurality of said displayed plurality of modifiers.

45. The method of claim 41, wherein each of the displayed plurality of modifiers is associated with a same plurality of subsequent activations of the reels.

46. The method of claim 41, wherein a plurality of said displayed plurality of modifiers are each associated with a different plurality of subsequent activations of the reels.

47. The method of claim 41, wherein more than one of the displayed plurality of modifiers is activated for at least one subsequent activation of the reels.

48. The method of claim 41, which is provided to the player through a data network.

49. The method of claim 48, wherein the data network is an internet.

50. A method of operating a gaming device, said method comprising:

(a) causing at least one processor to execute a plurality of instructions stored in at least one memory device to operate a play of a primary wagering game, wherein said primary wagering game is associated with at least one winning outcome and includes at least one modifier activator symbol;

(b) causing the at least one processor to execute the plurality of instructions to cause any award to be provided to a player in response to the at least one winning outcome;

(c) causing the at least one processor to execute the plurality of instructions to determine whether the modifier activator symbol is displayed;

(d) causing the at least one processor to execute the plurality of instructions to operate with at least one display device to, after the display of the at least one modifier activator symbol, display:

(i) a plurality of different modifiers, and (ii) a modifier function associated with each of the displayed plurality of modifiers;

(e) causing the at least one processor to execute the plurality of instructions to operate with the at least one display device and at least one input device to, after the display of the modifier functions associated with the displayed plurality of modifiers, receive, from the player, a selection of one of the displayed plurality of modifiers, wherein each of said displayed plurality of modifiers is associated with a quantity of at least two subsequent plays of the primary wagering game;

(f) causing the at least one processor to execute the plurality of instructions to repeat steps (a) to (b) at least the quantity of subsequent plays, wherein at least one function of the primary wagering game is modified based on the modifier function associated with the player selected modifier; and (g) causing the at least one processor to execute the plurality of instructions to, for each of the subsequent plays which result in the at least one winning outcome, cause the player to be provided with an additional award, the additional award being based, at least in part, on the modification.

51. The method of claim 50, wherein at least one of the displayed plurality of modifiers is selected if the player obtains at least one modifier activator symbol in one of the subsequent plays of the primary wagering game.

52. The method of claim 50, which includes causing the at least one processor to execute the plurality of instructions to indicate any of the displayed plurality of modifiers that is currently activated and the plurality of remaining subsequent plays of the primary wagering game that the player selected modifier will be activated.

53. The method of claim 50, which includes causing the at least one processor to execute the plurality of instructions to operate with the at least one input device to enable the player to select a plurality of the displayed plurality of modifiers.

54. The method of claim 50, wherein each of the displayed plurality of modifiers is associated with a same plurality of subsequent plays of the primary wagering game.

55. The method of claim 50, wherein a plurality of said displayed plurality of modifiers are each associated with a different plurality of subsequent plays of the primary wagering game.

56. The method of claim 50, which is provided to the player through a data network.

57. The method of claim 56, wherein the data network is an internet.

* * * * *

UNITED STATES PATENT AND TRADEMARK OFFICE

CERTIFICATE OF CORRECTION

PATENT NO. : 8,177,620 B2
APPLICATION NO. : 10/539848
DATED : May 15, 2012
INVENTOR(S) : Michael J. Miles et al.

It is certified that error appears in the above-identified patent and that said Letters Patent is hereby corrected as shown below:

IN THE CLAIMS

In Claim 1, Column 22, Lines 47 and 49, between both instances of "the" and "modifier" insert --at least one--.
In Claim 7, Column 23, Line 29, between "said" and "modifier" insert --at least one-- and delete the "," following "modifier".
In Claim 9, Column 23, Line 39, delete "at least".
In Claim 11, Column 23, Line 48, between "said" and "modifier" insert --at least one--.
In Claim 14, Column 23, Line 59, between "if" and "at" insert --the--.
In Claim 19, Column 24, Line 36, between "indicated" and "symbol" insert --at least one of the-- and replace "symbol" with --symbols--.
In Claim 19, Column 24, Line 38, between "the" and "modifier" insert --at least one--.
In Claim 19, Column 24, Line 40, between "the" and "modifier" insert --at least one--.
In Claim 21, Column 25, Line 34, replace "a" with --the--.
In Claim 29, Column 26, Line 22, delete "at least".
In Claim 30, Column 26, Line 28, delete "at least".
In Claim 50, Column 28, Line 44, between "the" and "modifier" insert --at least one--.
In Claim 51, Column 29, Line 9, between "obtains" and "at" insert --the--.

Signed and Sealed this
Twenty-eighth Day of May, 2013

Teresa Stanek Rea
*Acting Director of the United States Patent and Trademark Office*